US012425644B2

United States Patent
Jung et al.

(10) Patent No.: US 12,425,644 B2
(45) Date of Patent: Sep. 23, 2025

(54) METHOD FOR VIDEO PROCESSING, ENCODER FOR VIDEO PROCESSING, AND DECODER FOR VIDEO PROCESSING

(71) Applicant: GUANGDONG OPPO MOBILE TELECOMMUNICATIONS CORP., LTD., Guangdong (CN)

(72) Inventors: Cheolkon Jung, Guangdong (CN); Qipu Qin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/620,952

(22) Filed: Mar. 28, 2024

(65) Prior Publication Data

US 2024/0244254 A1   Jul. 18, 2024

Related U.S. Application Data

(63) Continuation of application No. PCT/CN2021/138494, filed on Dec. 15, 2021.

(30) Foreign Application Priority Data

Sep. 28, 2021   (WO) ................ PCT/CN2021/121381

(51) Int. Cl.
*H04N 19/573*   (2014.01)
*H04N 19/105*   (2014.01)
(Continued)

(52) U.S. Cl.
CPC ......... *H04N 19/573* (2014.11); *H04N 19/105* (2014.11); *H04N 19/114* (2014.11);
(Continued)

(58) Field of Classification Search
CPC .. H04N 19/573; H04N 19/105; H04N 19/114; H04N 19/124
(Continued)

(56) References Cited

U.S. PATENT DOCUMENTS 12,028,527 B2 *  7/2024  Chen .................... H04N 19/70
2006/0256866 A1  11/2006  Ziauddin et al.
(Continued)

FOREIGN PATENT DOCUMENTS

CN        1943244       4/2007
CN       104704833      6/2015
(Continued)

OTHER PUBLICATIONS

WIPO, International Search Report and Written Opinion for International Application No. PCT/CN2021/121381, Jun. 27, 2022.
(Continued)

*Primary Examiner* — Dave Czekaj
(74) *Attorney, Agent, or Firm* — Hodgson Russ LLP

(57) ABSTRACT

A method for video processing, comprising: parsing a first bitstream to determine a first quantized motion feature, wherein the first quantized motion feature is formed from first motion information of a luma current picture, wherein the first motion information is determined based on the luma current picture and first bi-directional predictive (B/P) pictures in a first group of pictures (GOP) based on first sets of reference pictures of the luma current picture; and decoding the first quantized motion feature to form a luma motion information by an MV decoder.

20 Claims, 18 Drawing Sheets

(51) Int. Cl.
- *H04N 19/114* (2014.01)
- *H04N 19/124* (2014.01)
- *H04N 19/139* (2014.01)
- *H04N 19/172* (2014.01)
- *H04N 19/177* (2014.01)
- *H04N 19/186* (2014.01)
- *H04N 19/42* (2014.01)
- *H04N 19/52* (2014.01)
- *H04N 19/70* (2014.01)

(52) U.S. Cl.
CPC ......... *H04N 19/124* (2014.11); *H04N 19/139* (2014.11); *H04N 19/172* (2014.11); *H04N 19/177* (2014.11); *H04N 19/186* (2014.11); *H04N 19/42* (2014.11); *H04N 19/52* (2014.11); *H04N 19/70* (2014.11)

(58) Field of Classification Search
USPC .................................................... 375/240.03
See application file for complete search history.

(56) References Cited

U.S. PATENT DOCUMENTS

| | | | |
|---|---|---|---|
| 2009/0285300 A1 | 11/2009 | Han et al. | |
| 2010/0296579 A1* | 11/2010 | Panchal | H04N 19/142 |
| | | | 375/E7.243 |
| 2013/0336405 A1* | 12/2013 | Chen | H04N 19/597 |
| | | | 375/240.16 |
| 2014/0169483 A1* | 6/2014 | Kumar | H04N 19/80 |
| | | | 375/240.29 |
| 2017/0372494 A1* | 12/2017 | Zhu | H04N 19/521 |
| 2018/0324457 A1 | 11/2018 | Murata | |
| 2019/0320175 A1 | 10/2019 | Mao | |
| 2020/0099952 A1 | 3/2020 | Kanoh et al. | |
| 2020/0204806 A1 | 6/2020 | Jin et al. | |
| 2021/0176509 A1 | 6/2021 | Maze et al. | |
| 2021/0185309 A1 | 6/2021 | Zheng et al. | |
| 2021/0185325 A1 | 6/2021 | Chen et al. | |
| 2022/0377358 A1 | 11/2022 | Galpin et al. | |
| 2022/0394240 A1* | 12/2022 | Zhang | H04N 19/593 |
| 2023/0336759 A1 | 10/2023 | Ikonin et al. | |

FOREIGN PATENT DOCUMENTS

| | | |
|---|---|---|
| CN | 112771850 | 5/2021 |
| WO | 2021055360 | 3/2021 |
| WO | 2022191933 | 9/2022 |

OTHER PUBLICATIONS

WIPO, International Search Report and Written Opinion for International Application No. PCT/CN2021/138494, Jul. 1, 2022.
"Series H: Audiovisual and Multimedia Systems: Infrastructure of audiovisual services—Coding of moving video: High efficiency video coding," International Telecommunication Union, H.265, Nov. 2019.
"Series H: Audiovisual and Multimedia Systems: Infrastructure of audiovisual services—Coding of moving video: Versatile video coding," International Telecommunication Union, H.266, Aug. 2020.
EPO, Partial Supplementary European Search Report for EP Application No. 21958669.0, Apr. 25, 2025.
USPTO, Non-Final Rejection for U.S. Appl. No. 18/617,538, filed May 13, 2025.
Tsai et al., "Robust Video Coding Based on Hybrid Hierarchical B Pictures", IEEE Transactions on Circuits and Systems for Video Technology, May 2014, vol. 24, No. 5.
EPO, Extended European Search Report for EP Application No. 21959151.8, Jul. 18, 2025.

* cited by examiner

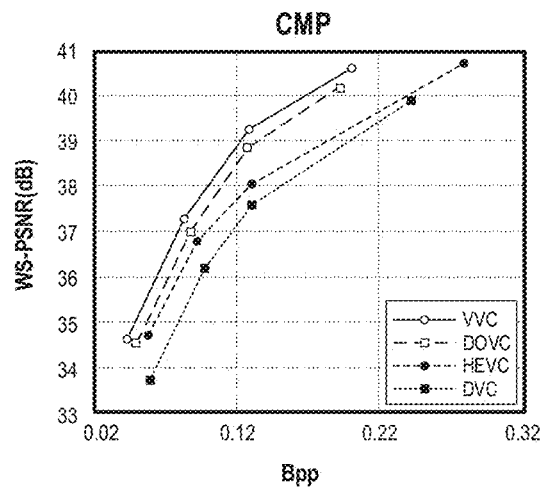 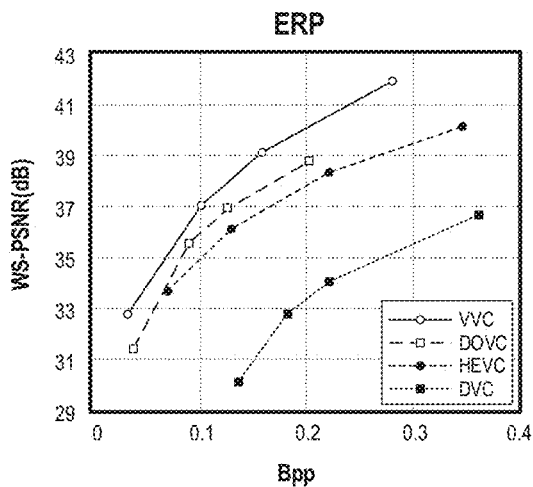
*FIG. 16A*    *FIG. 16B*
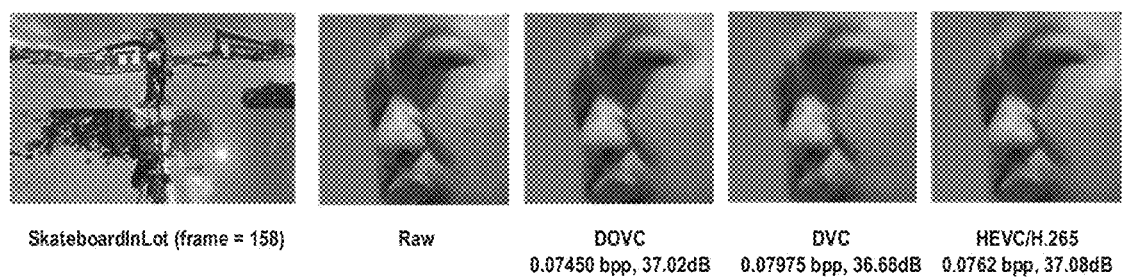
*FIG. 17*

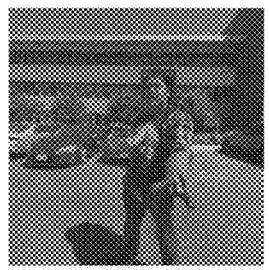
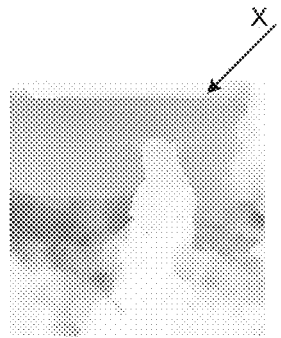
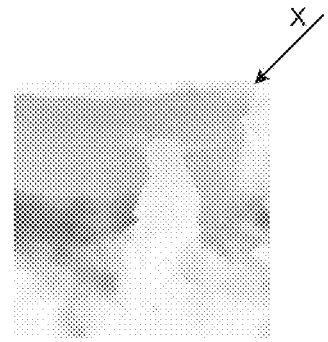
FIG. 18A    FIG. 18B    FIG. 18C
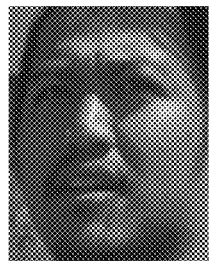
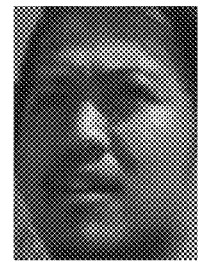
FIG. 18D    FIG. 18E
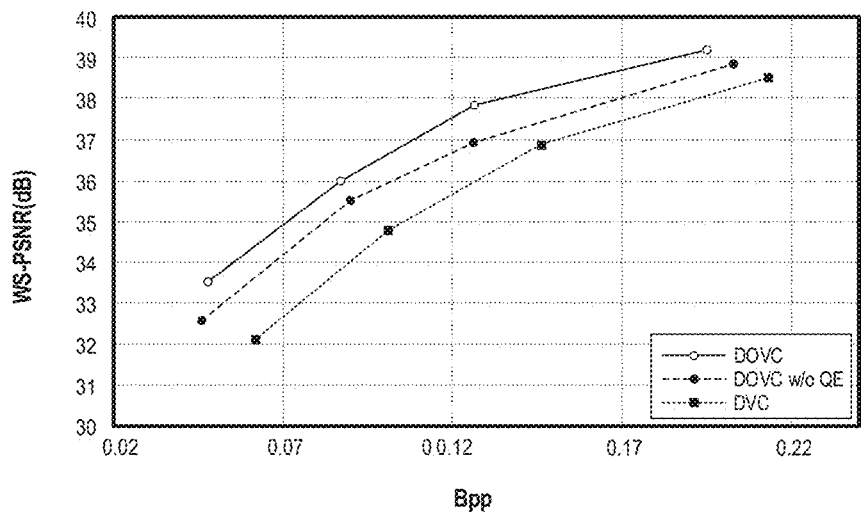
FIG. 19

| | DOVC vs HM16.16 | | | | | |
|---|---|---|---|---|---|---|
| | Y | | U | | V | |
| | BDBR (%) | BD-WSPSNR (dB) | BDBR (%) | BD-WSPSNR (dB) | BDBR (%) | BD-WSPSNR (dB) |
| Class S1 (8K) | -31.03 | 1.31 | -31.19 | 0.86 | -33.20 | 0.82 |
| Class S2 (6K) | -43.33 | 1.68 | -41.19 | 0.92 | -41.28 | 0.92 |
| Average | -37.18 | 1.50 | -36.19 | 0.89 | -37.24 | 0.87 |

| | DOVC vs VTM12.0 | | | | | |
|---|---|---|---|---|---|---|
| | Y | | U | | V | |
| | BDBR (%) | BD-WSPSNR (dB) | BDBR (%) | BD-WSPSNR (dB) | BDBR (%) | BD-WSPSNR (dB) |
| Class S1 (8K) | 4.40 | -0.15 | 25.77 | -0.51 | 18.10 | -0.39 |
| Class S2 (6K) | -3.88 | 0.10 | 1.79 | -0.40 | 13.42 | -0.21 |
| Average | 0.26 | -0.03 | 13.78 | -0.46 | 15.76 | -0.30 |

METHOD FOR VIDEO PROCESSING, ENCODER FOR VIDEO PROCESSING, AND DECODER FOR VIDEO PROCESSING

CROSS-REFERENCE TO RELATED APPLICATION

This application is a continuation of International Application No. PCT/CN2021/138494, filed Dec. 15, 2021, which claims priority to International Application No. PCT/CN2021/121381, filed Sep. 28, 2021, the entire disclosures of which are incorporated herein by reference.

TECHNICAL FIELD

The present disclosure relates to video compression schemes, including schemes involving deep omnidirectional video compression (DOVC). More specifically, the present disclosure is directed to a method for video processing, an encoder for video processing, and a decoder for video processing.

BACKGROUND

When transmitting images/videos, an encoder can utilize spatial correlation between pixels and temporal correlation between frames/pictures to compress the images/videos and transmit the compressed images/videos in a bitstream. A decoder can then reconstruct the images/videos from the bitstream. Researchers in this field have been committed to exploring a better compromise between a compression rate (e.g., bit-rate, R) and image distortion (D). In the past few decades, a series of image/video coding standards (e.g., JPEG, JPEG 2000, AVC, and HEVC) have been developed. Challenges remain in general compression performance and complexity.

Recent studies of video compression based on deep learning include two major aspects. First, some studies combine deep learning with traditional hybrid video compression. For example, replacing modules of loop filter, motion estimation, and motion compensation with neural networks. Disadvantages of traditional hybrid video compression frameworks include: (1) high complexity and (2) limits of optimization. Consumers' demands for high quality contents (e.g., resolutions 4K, 6K, 8K, etc.) result in remarkable increases of coding/decoding time and algorithm complexity. In addition, traditional hybrid video compression frameworks do not provide "end-to-end" global optimization. Second, some studies include deep learning-based video compression (DVC) framework focus only on 2D videos for compression. These traditional DVC frameworks use a pre-trained optical flow network to estimate motion information, and thus it is impossible to update their model parameters in real time to output optimal motion features. Also, the optical flow network only takes the previous frame as reference, which means that only "uni-directional" motion estimation is performed. Further, these traditional DVC frameworks fail to address data transmission problems from encoders to decoders. In other words, the traditional DVC frameworks require video sequence parameters to be manually provided to the decoder side (otherwise their decoders will not be able to decode videos). Therefore, it is advantageous to have improved methods or systems to address the foregoing issues.

SUMMARY

One aspect of the present disclosure provides a method for video processing, comprising: parsing a first bitstream to determine a first quantized motion feature, wherein the first quantized motion feature is formed from first motion information of a luma current picture, wherein the first motion information is determined based on the luma current picture and first bi-directional predictive (B/P) pictures in a first group of pictures (GOP) based on first sets of reference pictures of the luma current picture; and decoding the first quantized motion feature to form a luma motion information by an MV decoder.

One aspect of the present disclosure provides an encoder for video processing, comprising: a processor; a memory configured to store instructions, when executed by the processor, to: separate a video into a chroma component and a luma component; receive a luma current picture of the luma component of the video; determine luma bi-directional predictive (B/P) pictures in a group of pictures (GOP) associated with the luma current picture; and perform a motion estimation (ME) process based on the luma current picture and the luma bi-directional predictive pictures so as to generate luma motion information of the luma current picture.

On aspect of the present disclosure provides a decoder for video processing, comprising: a processor; a memory configured to store instructions, when executed by the processor, to: parse a first bitstream to obtain a first quantized motion feature, wherein the first quantized motion feature is formed from first motion information of a luma current picture, wherein the first motion information is determined based on first bi-directional predictive (B/P) pictures in a first group of pictures (GOP) based on first sets of reference pictures of the luma current picture, and wherein the luma current picture is from a luma component separated from a video; decode the first quantized motion feature to form a luma motion information by an MV decoder.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

FIGS. 16A and 16B are charts showing performance comparison of 360-degree videos projected to CMP and ERP formats.

FIG. 17 includes images illustrating visual comparison among different methods.

FIGS. 18A-E include images illustrating visual comparison among different methods. FIG. 18A shows a raw frame image. FIG. 18B shows a fused offset prediction map (DOVC) image. FIG. 18C shows an optical flow map image. FIG. 18D shows a bi-directional compensation (DOVC) image. FIG. 18E shows an uni-directional compensation (optical flow) image.

FIG. 19 is a chart illustrating analyses on a quality enhance (QE) module in accordance with one or more implementations of the present disclosure.

DETAILED DESCRIPTION

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

Figure 1:
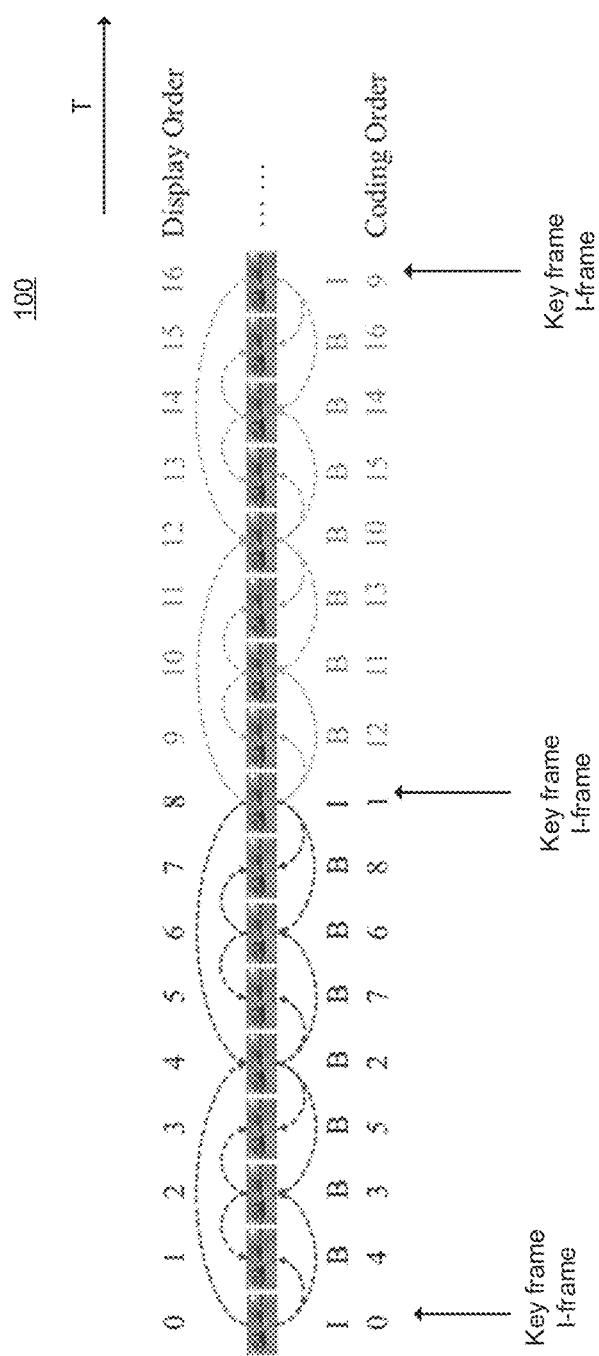
FIG. 1 is a schematic diagram illustrating bi-directional prediction rules in accordance with one or more implementations of the present disclosure.

FIG. 1 is a schematic diagram illustrating bi-directional prediction rules in accordance with one or more implementations of the present disclosure. As shown in FIG. 1, a video sequence 100 includes multiple pictures 1-N (only 0-16 are shown) in a time domain T (indicated by "displayer order"). In the illustrated embodiment, the GOP of the video sequence is set as "9." By this arrangement, pictures 0-8 are in one group, and pictures 8-16 are in another group. In each GOP, there is a start picture $x_s^I$ (e.g., picture 0, picture 8, etc.) and an end picture $x_e^I$ (e.g., picture 8, picture 16, etc.). Both the start and end pictures are key pictures or "I-pictures," noted by "I." The remaining pictures (e.g., pictures 1-7, pictures 9-15, etc.) are bi-directional predictive pictures (B/P-pictures), noted by "B." The bi-directional predictive pictures can be determined based on the key pictures.

For example, picture 4 can be determined based on picture 0 and 8. Picture 2 can be determined based on picture 0 and picture 4, whereas picture 6 can be determined based on picture 4 and picture 8. The rest of the pictures can then be determined by similar approaches. By this arrangement, the "non-key" pictures can be predicted in a "bi-directional" fashion. In some embodiments, the current picture $x_t$ discussed herein can be one of the pictures to be predicted. The order of coding the foregoing pictures 0-16 are indicated by "coding order" in FIG. 1.

Figure 6:
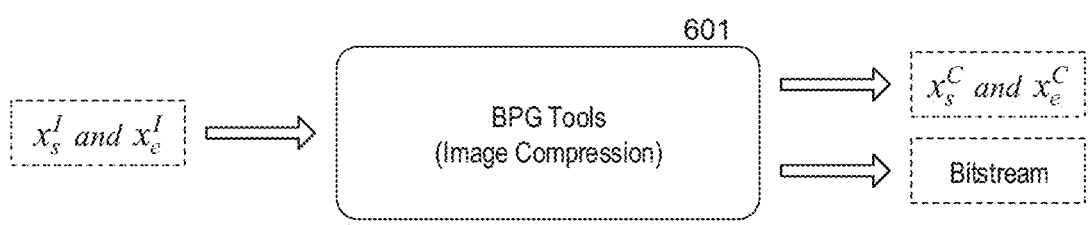
FIG. 6 is a schematic diagram illustrating key pictures in accordance with one or more implementations of the present disclosure.

Referring now to FIG. 6, based on the key pictures $x_s^I$ and $x_e^I$, reference pictures can be generated. In the illustrated embodiments, a better portable graphics (BPG) image compression tool 601 can be used to compress the key pictures to form reconstructed pictures $x_s^C$ and $x_e^C$, which can be used as reference pictures in further process (e.g., FIG. 2). In some embodiments, other suitable image compression/decompression tool can be used to generate the reference pictures.

Figure 2:
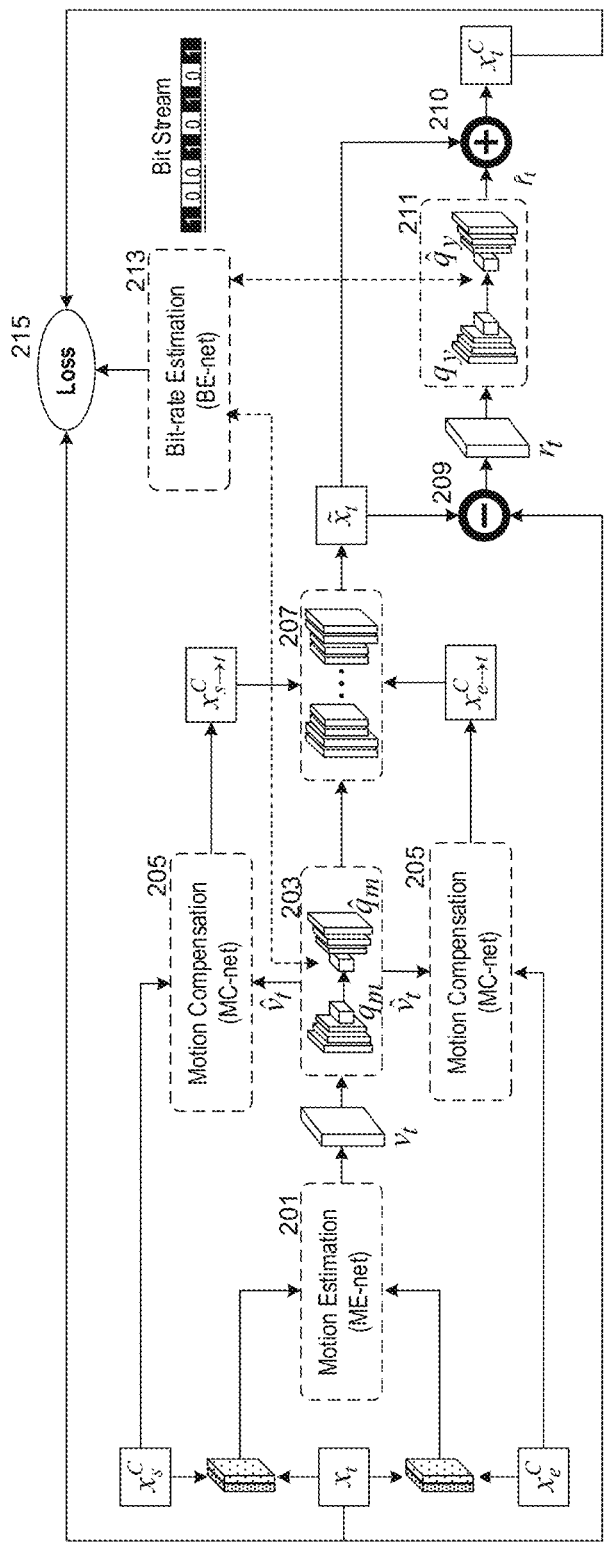
FIG. 2 is a schematic diagram illustrating a bi-directional predictive picture compression process in accordance with one or more implementations of the present disclosure.

FIG. 2 is a schematic diagram illustrating a bi-directional predictive picture compression process in accordance with one or more implementations of the present disclosure. As shown in FIG. 2, the current picture $x_t$ and the reference pictures $x_s^C$ and $x_e^C$ are combined as an input for an ME module (or ME network) 201. The ME module 201 generates current motion information $v_t$. The current motion information is then encoded by a motion vector (MV) encoder/decoder 203 to form a latent motion feature $m_t$ or $q_m$, and then the latent motion feature $m_t$ or $q_m$ is quantized to obtain a quantized motion feature $\hat{m}_t$ or $\hat{q}_m$. The quantized motion feature $\hat{m}_t$ or $\hat{q}_m$ is then decoded by the MV encoder/decoder 203 to form motion information $\hat{v}_t$.

A motion compensation (MC) module 205 utilizes a bi-directional motion compensation process 207 to form a predicted picture $\tilde{x}_t$ according to the motion information $\hat{v}_t$ and the aforementioned reference pictures (e.g., reconstructed pictures $x_s^C$ and $x_e^C$).

At a substractor 209, the difference between the predicted picture $\tilde{x}_t$ and the current picture $x_t$ is calculated. The difference is defined as current residual information $r_t$. The current residual information $r_t$ is then encoded (by a residual encoder/decoder 211) to generate a latent residual feature $y_t$ or $q_y$. Then latent residual feature $y_t$ or $q_y$ is quantized to obtain a quantized residual feature $\hat{y}t$ or $\hat{q}_y$. The quantized residual feature $\hat{y}_t$ or $\hat{q}_y$ is then decoded to get residual information $\hat{r}_t$. The prediction picture $\tilde{x}_t$ and the residual information $\hat{r}_t$ are added (at an adder 210) to obtain a reconstructed picture $x_t^C$.

To repeat the foregoing bi-directional process for the whole video sequence, the reconstructed pictures $x_s^C$ and $x_t^C$ can be used as reference pictures, and then set the next picture $$``t = \frac{s+t}{2}."$$

In some embodiment, similarly, the reconstructed pictures $x_e^C$ and $x_t^C$ can be used as reference pictures, and then set the next picture $$``t = \frac{e+t}{2}."$$

In some embodiments, a bit-rate estimation module 213 can be used to determine a bit rate (R) for the encoder/decoder 203 and the residual encoder/decoder 211. The bit rate R can also be used to optimize the present DOVC framework by providing it as an input to a loss function module 215. The loss function module 215 can improve the present DOVC framework by optimizing a loss function such as "λD+R," wherein "D" is a distortion parameter, "λ" is a Lagrangian coefficient, and R is the bit rate.

Figure 3:
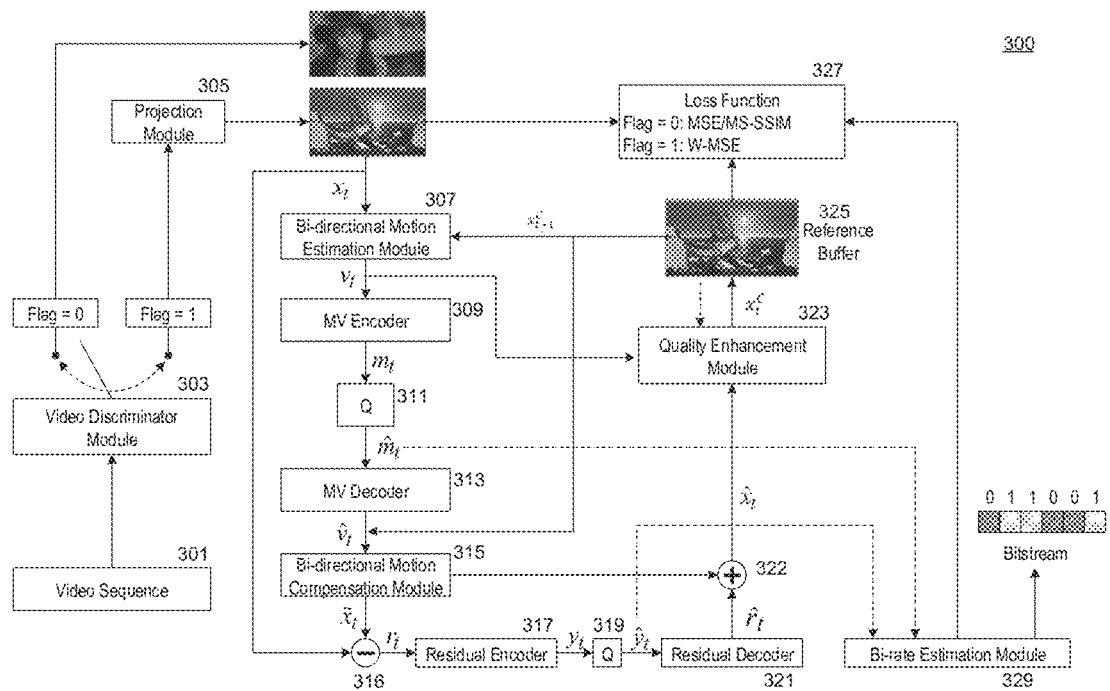
FIG. 3 is a schematic diagram of a DOVC framework in accordance with one or more implementations of the present disclosure.

FIG. 3 is a schematic diagram of a DOVC framework 300 in accordance with one or more implementations of the present disclosure. The DOVC framework 300 includes a video discriminator module 303 to receive a video sequence 301. The video discriminator module 303 is also configured to determine if the video sequence 301 includes an omnidirectional video sequence. If so, the video discriminator module 303 is configured to set a "flag" so as to identify the type of the video sequence. For example, if the flag is set as "0," it indicates there is only 2D images in the video sequence 301. If the flag is set as "1," it indicates there is an omnidirectional video therein. A projection module 305 is configured to process the omnidirectional video by projecting the omnidirectional video to plane images. Embodiments of a sphere-to-plane projection process 500 are discussed in detail with reference to FIG. 5. Further, according to the value of the flag, different loss function can be selected. Embodiments of the selection of the loss function are discussed in detail with reference to FIG. 15.

Figure 5:
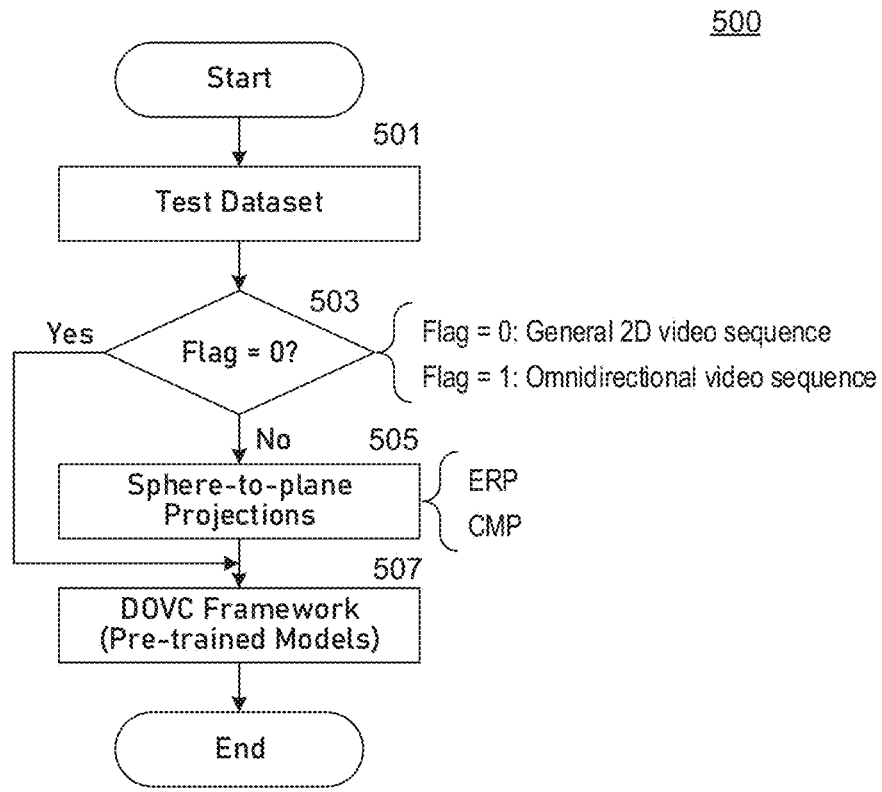
FIG. 5 is a flowchart of a method in accordance with one or more implementations of the present disclosure.

Referring now to FIG. 5, the process 500 starts by examining or testing a data dataset (e.g., the video sequence 301), at block 501. The process 500 continues to decision block 503 to determine if the data dataset includes a flag. The flag "0" indicates the dataset includes/is a general 2D video sequence, and the flag "1" indicates the dataset is/includes an omnidirectional video sequence. If the flag indicates "0," the process 500 moves to block 507 to provide feedback to a pre-trained DOVC framework for future training. If the flag indicates "1," the process 500 moves to block 505 to perform a sphere-to-plane projection on the data dataset. The sphere-to-plane projection can be an equirectangular projection (ERP) or a cube-map projection (CMP). Once complete, the projected dataset can be further processed (referring back to FIG. 3) and the process 500 can further move to block 507 to provide feedback to the pre-trained DOVC framework for future training.

Referring back to FIG. 3, the DOVC framework 300 also includes a loss function module 327 for future training. Processing/results of the video discriminator module 303 and the projection module 305 can be transmitted to the loss function module 327. Different loss functions can be used for different flag indications. For example, when the flag indicates "0," Mean Squared Error (MSE) functions or Multi-scale Structural Similarity (MS-SSIM) functions can be used. When the flag indicates "1," weighted Mean Squared Error (WMSE) function can be used.

After the video sequence 301 is examined and/or processed (e.g., projected), current picture $x_t$ and reference (or reconstructed) pictures from previous picture $\hat{x}_{t-1}$ (from a reference buffer 325) can be combined as input for a bi-directional ME module 307. The bi-directional ME module 307 generates current motion information $v_t$. The current motion information $v_t$ is then encoded by a motion vector (MV) encoder 309 to form a latent motion feature $m_t$, and then the latent motion feature $m_t$ is quantized by a quantization module 311 to obtain a quantized motion feature $\hat{m}_t$. The quantized motion feature $\hat{m}_t$ is then decoded by the MV decoder 313 to form predicted motion information $\hat{v}_t$.

The predicted motion information $\hat{v}_t$ is then directed to a bi-directional motion compensation (MC) module 315 to form a predicted picture $\tilde{x}_t$. The predicted picture $\tilde{x}_t$ is further directed to a substractor 316, where the difference between the predicted picture $\tilde{x}_t$ and the current picture $x_t$ is calculated. The difference is defined as current residual information $r_t$.

The current residual information $r_t$ is then encoded (by a residual encoder 317) to generate a latent residual feature $y_t$. Then latent residual feature $y_t$ is quantized (by a quantization module 319) to obtain a quantized residual feature $\hat{y}_t$. The quantized residual feature $\hat{y}_t$ is then decoded (by a residual decoder 321) to get predicted residual information $\hat{r}_t$. The prediction picture $\tilde{x}_t$ and the prediction residual information $\hat{r}_t$ are directed to an adder 322 to obtain a reconstructed picture $\hat{x}_t$. The reconstructed picture $\hat{x}_t$ can be used as future reference pictures and stored in the reference buffer 325.

In some embodiments, the reconstructed picture $\hat{x}_t$ can be directed to a quality enhancement (QE) module 323 for quality enhancement. The QE module 323 performs a convolutional process so as to enhance the image quality of the reconstructed pictures and obtain pictures $x_t^C$ with higher quality (i.e., quality-enhanced pictures $x_t^C$). Embodiments of the QE module 323 are discussed in detail with reference to FIG. 8 below.

The DOVC framework 300 can include a bit-rate estimation module 329 configured to determine a bit rate (R) for the MV encoder/decoder 309, 313 and the residual encoder/decoder 317, 321. The bit rate R can also be used to optimize the present DOVC framework 300 by providing it as an input to the loss function module 327. The loss function module 327 can improve the present DOVC framework 300 by optimizing a loss function.

Figure 4:
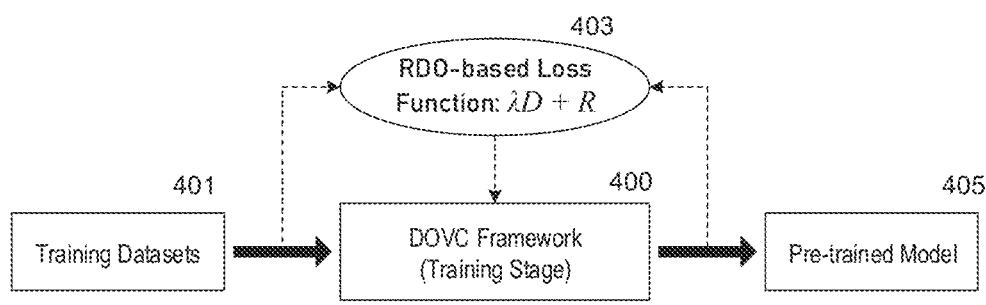
FIG. 4 is a schematic diagram illustrating a training stage of the DOVC framework in accordance with one or more implementations of the present disclosure.

FIG. 4 is a schematic diagram illustrating a training stage of a DOVC framework 400 in accordance with one or more implementations of the present disclosure. The DOVC framework 400 can be trained by inputting training datasets 401 into a rate distortion optimization (RDO)-based loss function 403. The training result can be directed to and improve a pre-trained model 405. By this arrangement, the DOVC framework 400 can be trained and improved.

Figure 7:
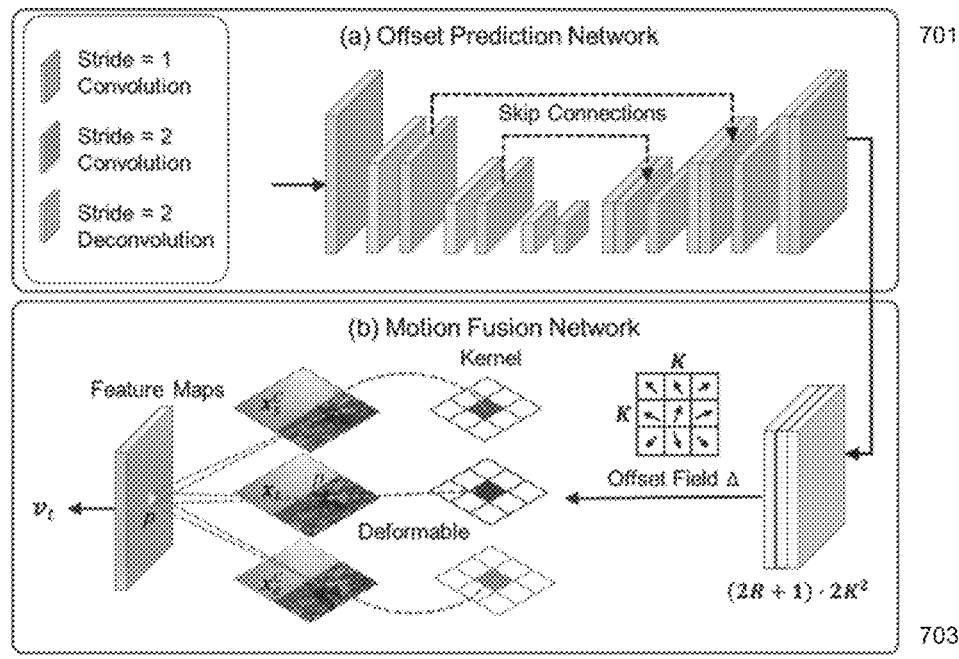
FIG. 7 is schematic diagram of a ME module in the DOVC framework in accordance with one or more implementations of the present disclosure.

FIG. 7 is schematic diagram of a ME module 700 in the DOVC framework in accordance with one or more implementations of the present disclosure. The ME module 700 includes an offset prediction module 701 and a deformable convolution module 703. The offset prediction module 701 is configured to implement a bi-directional offset prediction. The offset prediction module 701 takes three pictures (i.e., two reference pictures and a current picture) and then calculates offset values δ in an enlarged picture $K^2$ (i.e., "K×K"). The offset values δ can be added up as "(2R+1) $2K^2$" (wherein "2R" indicates the two reference pictures and "1" indicates the current picture). The offset values δ can then be processed in an offset field Δ (e.g., where an offset being detected and to be predicted) of the pictures. By using the enlarged picture $K^2$, the offset prediction module 701 can have a "U-shaped" picture structure (e.g., the reference pictures on both sides are larger, whereas the current picture in the middle is smaller). By this arrangement, the offset prediction module 701 can capture large temporal dynamics of an offset, and thus enhances its offset prediction qualities.

The deformable convolution module 703 is configured to fuse temporal-spatial information to generate motion information $v_t$. Output features (e.g., the offset values δ and the offset field Δ) form the offset prediction module 701 are fed into the deformable convolution module 703 as an input. The deformable convolution module 703 then performs a convolutional process by using multiple convolutional layers with different parameters (e.g., stride, kernel, etc.). As shown in FIG. 7, a feature map can be generated based on the results of the convolutional process for the current picture $x_t$ and the reference pictures $x_s^C$ and $x_e^C$. The feature map can be further processed by a QE module (FIG. 8).

Advantages of the ME module 700 include that it takes consecutive pictures together as an input so as to jointly consider and predict all deformable offsets at once (as compared to conventional optical flow methods that only handle one reference-target picture pair at a time).

In addition, the ME module 700 uses pictures with a symmetric structure (e.g., the "U-shaped" structure; meaning that the ME module 700 performs down-sampling and then up-sampling). Since consecutive pictures are highly correlated, offset prediction for the current picture can be benefited from the other adjacent pictures, which more effectively use temporal information of the fames, compared to conventional "pair-based" methods. Also, joint prediction is more computationally efficient at least because all deformable offsets can be obtained in a single process.

Figure 8:
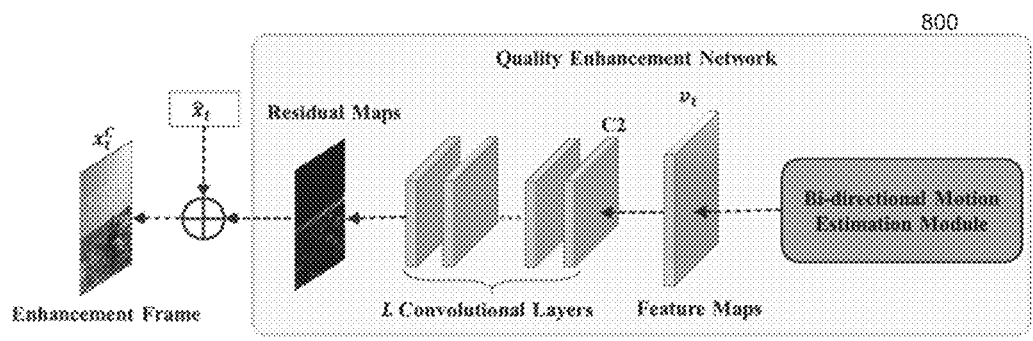
FIG. 8 is a schematic diagram illustrating a network structure of a quality enhancement module in accordance with one or more implementations of the present disclosure.

FIG. 8 is a schematic diagram illustrating a network structure 800 in accordance with one or more implementations of the present disclosure. In addition to the offset prediction module 701 and the deformable convolution module 703 discussed in FIG. 7, the network structure 800 includes a quality enhancement (QE) module 801 configured to further enhance the image quality. Using the feature map from the deformable convolution module 703 as an input, the QE module 801 can perform a convolutional process and generate a residual map. The residual map and a target (or reconstructed) picture $\hat{x}_t$ can be combined so as to form an enhanced target picture $x_t^C$. The enhanced target picture $x_t^C$ can be stored in a reference buffer (e.g., the reference buffer 325 in FIG. 3) for further processes.

In some embodiments, during the convolutional process performed by the QE module 801, a regular convolutional layer can be set as "stride 1, zero padding" so as to retain feature size. Deconvolutional layers with "stride 2" can be used for down-sampling and up-sampling. Rectified Linear Unit (ReLU) can be adopted as an activation function for all layers except the last layer (which uses linear activation to regress the offset field Δ). In some embodiments, a normalization layer is not used.

In some embodiments, the ME module, the MC module, and the QE module can be implemented in accordance with other standards, such as HEVC, VVC, etc., and are not limited to the DOVC framework disclosed herein.

Figure 9:
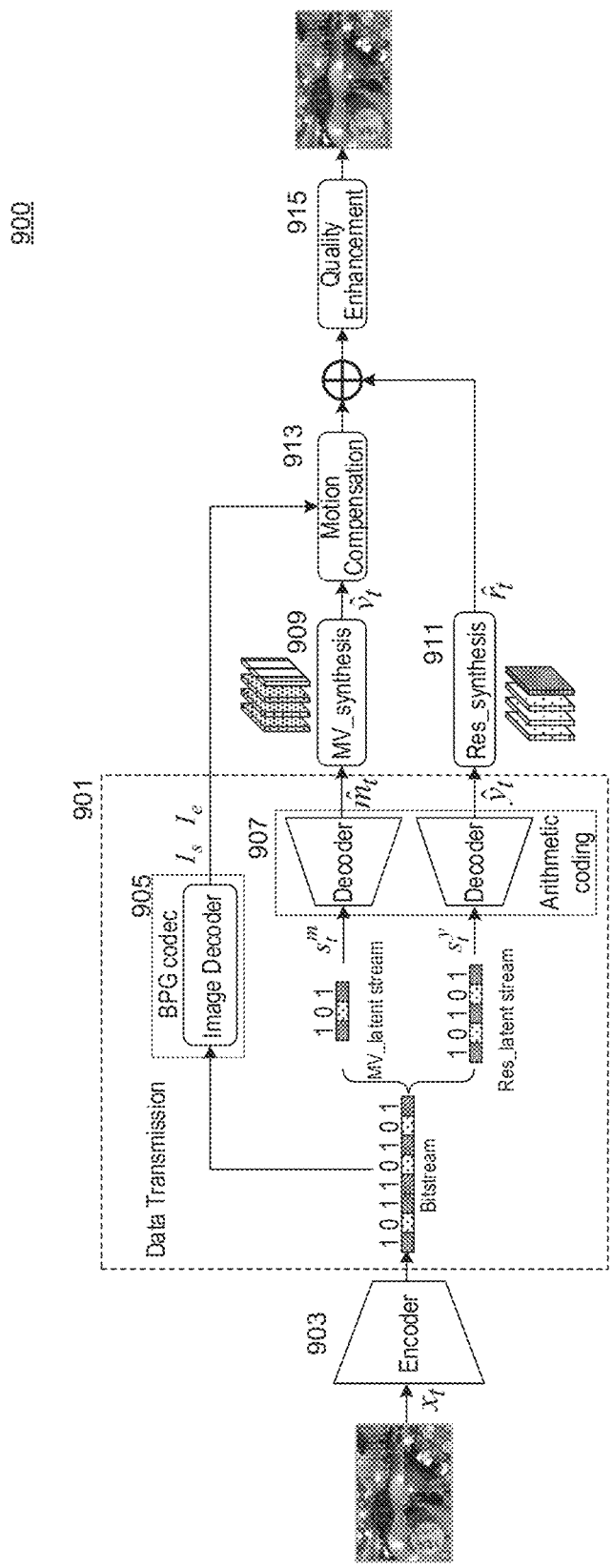
FIG. 9 is a schematic diagram illustrating a DOVC decoder framework in accordance with one or more implementations of the present disclosure.

FIG. 9 is a schematic diagram illustrating a system 900 having a DOVC decoder framework 901 in accordance with one or more implementations of the present disclosure. As shown, a current picture $x_t$ is encoded by an encoder 903 and then transmitted to the DOVC decoder framework 901. For key pictures or I-pictures $I_s$, $I_e$, an image decoder 905 can adopt a BPG tool with BPG codec for image compression and decompression. For bi-directional predictive pictures (B/P pictures), a decoder 907 utilizes a stand-alone version of arithmetic coder (e.g., developed by Mentzer et al.) for inter-picture compression and decompression. The B/P pictures are divided into an MV latent stream $s_t^m$, and a residual latent stream $s_t^y$. The decoder 907 respectively generates feature maps $\hat{m}_t$ and $\hat{y}_t$. The feature maps $\hat{m}_t$ and $\hat{y}_t$ are respectively sent to an MV decoder 909 and a residual decoder 911 and are inversely transformed into motion information $\hat{v}_t$ and residual information $\hat{r}_t$. Then a motion compensation (MC) module 913 integrates the I-pictures $I_s$, $I_e$, the motion information $\hat{v}_t$ and the residual information $\hat{r}_t$ to obtain a current reconstructed picture $\hat{x}_t$. Then a quality enhancement (QE) module 915 can further improve the quality of the reconstructed picture. The DOVC decoder framework 901 has an efficient data transmission scheme, as discussed with reference to FIG. 10 below. In some embodiments, the DOVC decoder framework 901 can be implemented without the QE module 915

Figure 10:
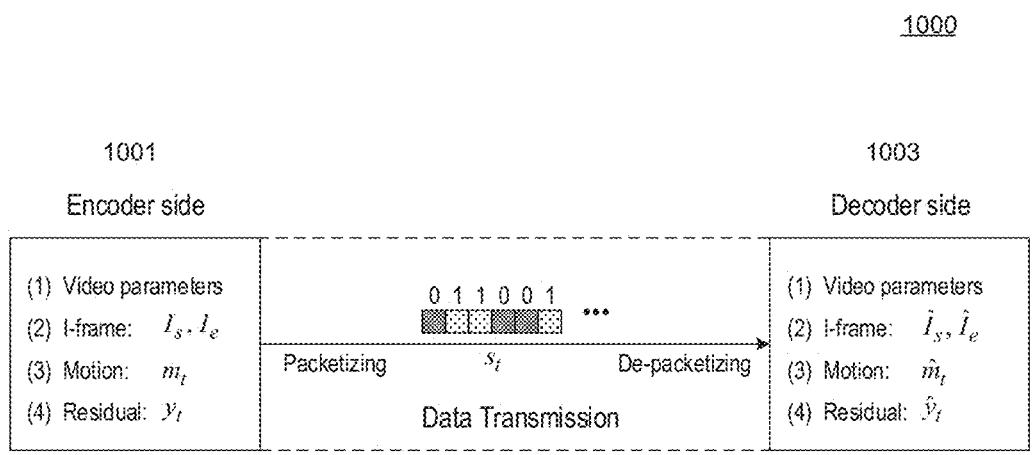
FIG. 10 is a schematic diagram illustrating data transmission in accordance with one or more implementations of the present disclosure.

FIG. 10 is a schematic diagram illustrating a data transmission scheme 1000 in accordance with one or more implementations of the present disclosure. The data transmission scheme 1000 represents the data transmission of the DOVC decoder framework 901. As shown, both encoder side 1001 and decoder side 1003 have four types of information: (1) video parameters (such as picture size, total number of pictures, GOP, flag, etc.); (2) key pictures; (3) motion information; and (4) residual information. In present methods and systems, these four types of information can be transmitted in one bitstream. In conventional, inefficient schemes, at least two types of information (1) and (2) need to be separately transmitted or manually provided to the decoder side. Therefore, the data transmission scheme 1000 is more efficient than conventional ones.

Figure 11:
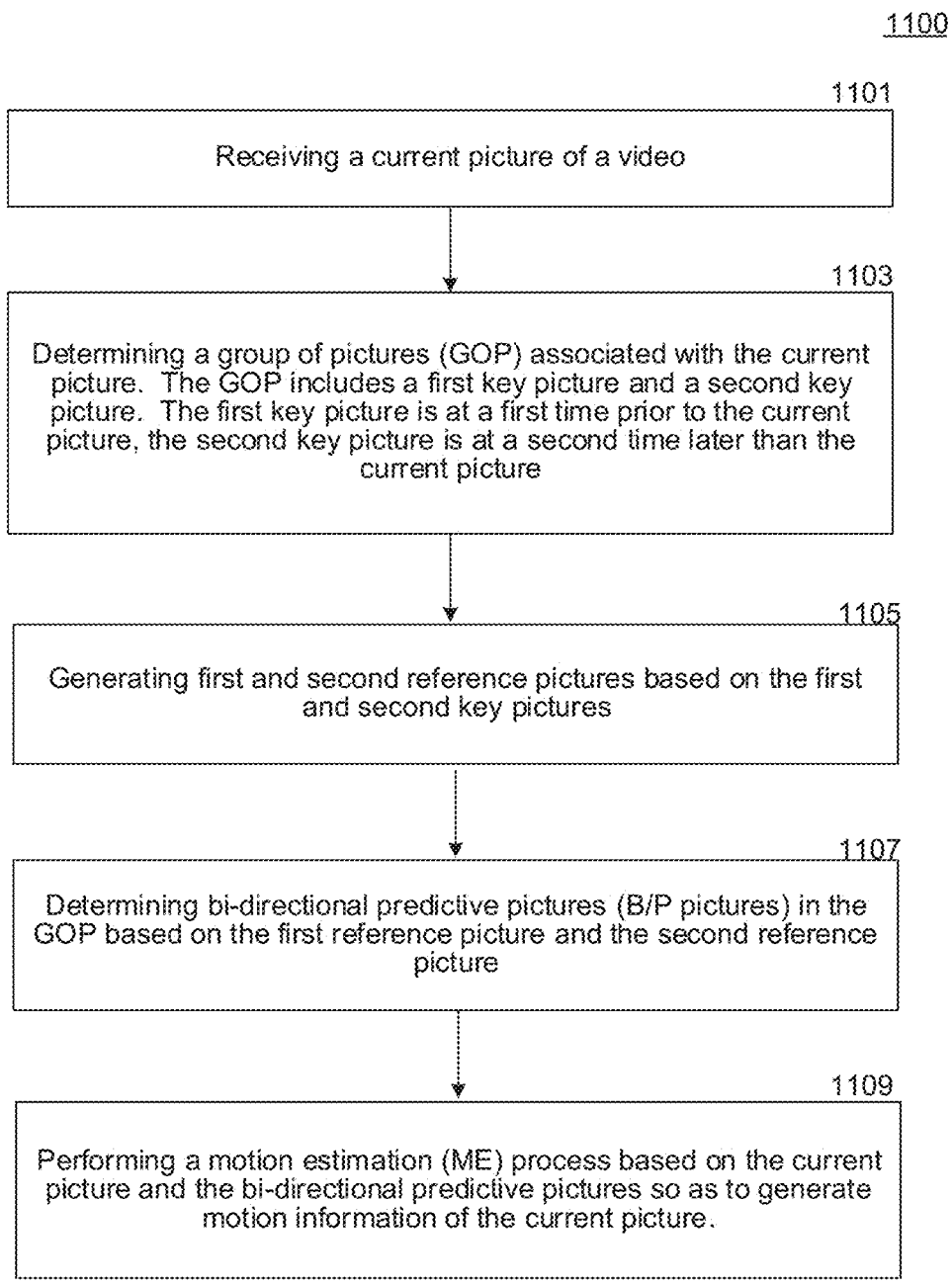
FIG. 11 is a flowchart of a method in accordance with one or more implementations of the present disclosure.

FIG. 11 is a flowchart of a method 1100 in accordance with one or more implementations of the present disclosure. The method 1100 can be implemented by a system (such as a system with the DOVC framework 300, including an encoder and a decoder). The method 1100 is for bi-directional image processing. The method 1100 includes, at block 1101, receiving a current picture $x_t$ of a video. At block 1103, the method 1100 continues by determining a group of pictures (GOP) associated with the current picture $x_t$. The GOP includes a first key picture $x_s^I$ and a second key picture $x_e^I$. The first key picture is at a first time prior to the current picture $x_t$, and the second key picture is at a second time later than the current picture $x_t$.

At block 1105, the method 1100 continues by generating a first reference picture based on the first key picture $x_s^I$ and generating a second reference picture based on the second key picture $x_e^I$. At block 1107, the method 1100 continues to determine bi-directional predictive pictures (B/P pictures) in the GOP based on the first reference picture and the second reference picture.

At block 1109, the method 1100 continues to perform a motion estimation (ME) process based on the current picture $x_t$ and the bi-directional predictive pictures so as to generate motion information $v_t$ of the current picture $x_t$.

In some embodiments, the first reference picture can be a first reconstructed picture $x_s^C$ based on the first key picture $x_s^I$ processed by a better portable graphics (BPG) image compression tool. The second reference picture can be a second reconstructed picture $x_e^C$ based on the second key picture $x_e^I$ processed by the BPG image compression tool.

In some embodiments, the method 1100 can further comprise: (i) encoding the motion information $v_t$ by a motion vector (MV) encoder so as to form a latent motion feature $m_t$ of the current picture $x_t$; (ii) quantizing the latent motion feature $m_t$ to form a quantized motion feature $\hat{m}_t$; (iii) transmitting the quantized motion feature $\hat{m}_t$ in a bitstream; (iv) receiving the quantized motion feature $\hat{m}_t$ from the bitstream; (v) decoding the quantized motion feature $\hat{m}_t$ to form a predicted motion information $\hat{v}_t$ by an MV decoder; and (vi) performing a motion compensation (MC) process based on the motion information $\hat{v}_t$ and the bi-directional predictive pictures to form a predicted picture $\tilde{x}_t$.

In some embodiments, the method 1100 can further comprise: (a) determining a current residual information $r_t$ by comparing the predicted picture $\tilde{x}_t$ and the current picture $x_t$; (b) encoding the current residual information $r_t$ by a residual encoder to form a latent residual feature $y_t$; (c) quantizing the latent residual feature $y_t$ to form a quantized residual feature $\hat{y}_t$; (d) decoding the quantized residual feature $\hat{y}_t$ by a residual decoder to form a predicted residual information $\hat{r}_t$; and (e) generating a reconstructed picture $x_t^C$ based on the predicted picture $\tilde{x}_t$ and the residual information $\hat{r}_t$.

In some embodiments, the method 1100 can further comprise setting the reconstructed picture $x_t^C$ as the first reference picture. In some embodiments, the method 1100 can further comprise determining, by a video discriminator module, whether the video includes an omnidirectional video sequence. The video discriminator module then sets a value of a flag. The value of the flag can be used to indicate whether the video includes the omnidirectional video sequence. In response to an event that video includes the omnidirectional video sequence, performing a sphere-to-plane projection on the omnidirectional sequence.

In some embodiments, the ME process is performed by an offset prediction network, the offset prediction network is configured to perform an offset prediction based on offset values ($\delta$) of the current picture $x_t$, the first reference picture, and the second reference picture. The offset values $\delta$ can be used to generate a feature map of the current picture $x_t$ by a spatiotemporal deformable convolution process. The feature map can used to form a residual map of the current picture $x_t$ by a quality enhancement module, and wherein the quality enhancement module includes multiple convolutional layers (L), and wherein the quality enhancement module performs a rectified linear unit (ReLU) activation process so as to form the residual map. The residual map is used to enhance a reconstructed picture $x_t^C$ generated based on the current picture $\hat{x}_t$.

Figure 12:
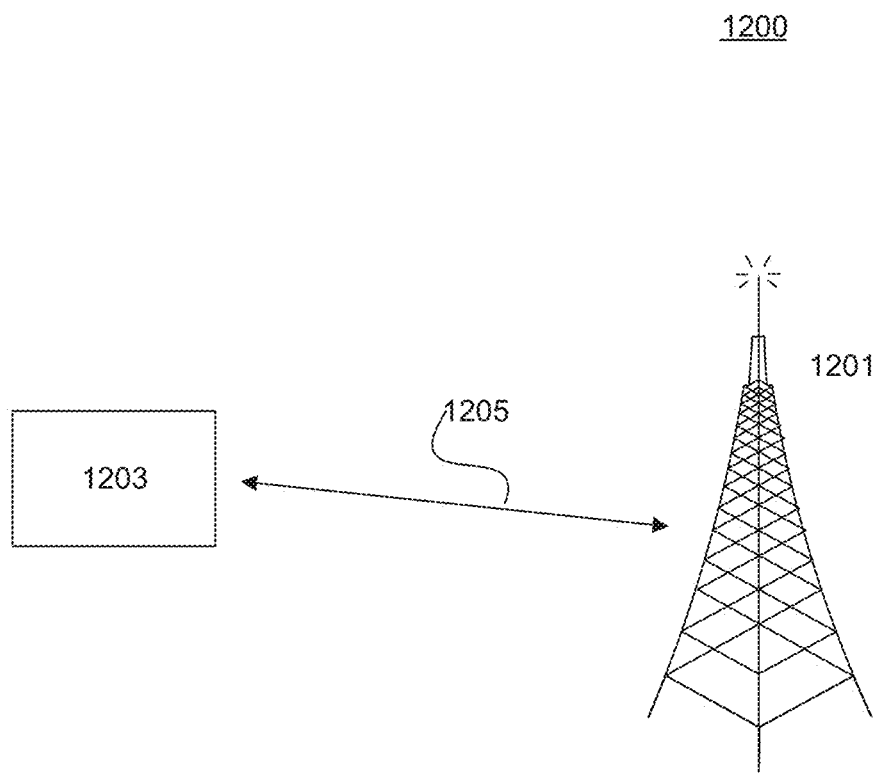
FIG. 12 is a schematic diagram of a wireless communication system in accordance with one or more implementations of the present disclosure.

FIG. 12 is a schematic diagram of a wireless communication system 1200 in accordance with one or more implementations of the present disclosure. The wireless communication system 1200 can implement the DOVC frameworks discussed herein. As shown in FIG. 12, the wireless communications system 1200 can include a network device (or base station) 1201. Examples of the network device 101 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device 1201 can include a relay station, an access point, an in-vehicle device, a wearable device, and the like. The network device 1201 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as a new radio (New Radio, NR) system or network.

In FIG. 12, the wireless communications system 1200 also includes a terminal device 1203. The terminal device 1203 can be an end-user device configured to facilitate wireless communication. The terminal device 1203 can be configured to wirelessly connect to the network device 1201 (via, e.g., via a wireless channel 1205) according to one or more corresponding communication protocols/standards. The terminal device 1203 may be mobile or fixed. The terminal device 1203 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 1203 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IOT) device, a device used in a 5G network, a device used in a public land mobile network, or the like. For illustrative purposes, FIG. 12 illustrates only one network device 1201 and one terminal device 1203 in the wireless communications system 1200. However, in some instances, the wireless communications system 1200 can include additional network device 1201 and/or terminal device 1203.

Figure 13:
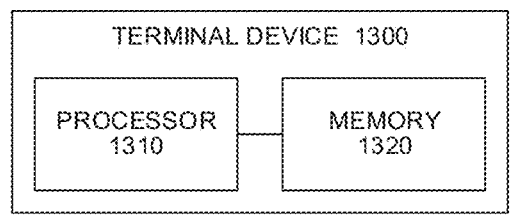
FIG. 13 is a schematic block diagram of a terminal device in accordance with one or more implementations of the present disclosure.

FIG. 13 is a schematic block diagram of a terminal device 1300 (e.g., which can implement the methods discussed herein) in accordance with one or more implementations of the present disclosure. As shown, the terminal device 1300 includes a processing unit 1310 (e.g., a DSP, a CPU, a GPU, etc.) and a memory 1320. The processing unit 1310 can be configured to implement instructions that correspond to the method 1100 of FIG. 11 and/or other aspects of the implementations described above. It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

Figure 14A:
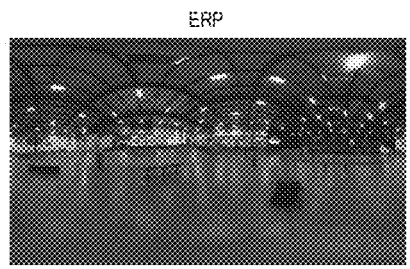
FIGS. 14A and 14B are images illustrating equirectangular projection (ERP) and cubemap projection (CMP) projection formats in accordance with one or more implementations of the present disclosure.
Figure 14B:
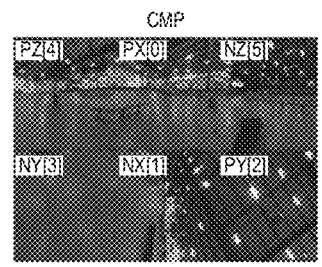

FIGS. 14A and 14B are images illustrating equirectangular projection (ERP) and cubemap projection (CMP) projection formats in accordance with one or more implementations of the present disclosure. The ERP and CMP can be used to process omnidirectional video sequences (e.g., by the projection module 305 in FIG. 3). In other embodiments, other suitable projection formats can also be utilized, such Octahedron Projection (OHP), Icosahedron Projection (ISP), etc. FIG. 14A shows a projected image based on ERP, whereas FIG. 14B shows a projected image based on CMP.

Figure 15:
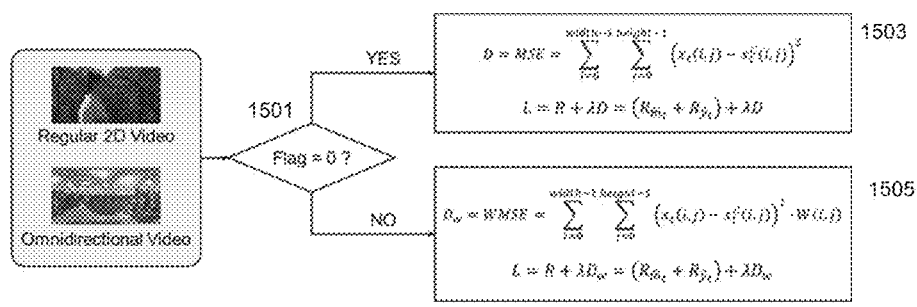
FIG. 15 is a schematic diagram illustrating a selection process of a loss function based on a flag in accordance with one or more implementations of the present disclosure.

FIG. 15 is a schematic diagram illustrating a selection process of a loss function based on a flag in accordance with one or more implementations of the present disclosure. Please also refer to the descriptions for the video discriminator module 303 and the loss function module 327 in FIG. 3. At decision block 1501, an input video is examined and to see if there is a flag and a corresponding flag value. If the flag indicates "0," Mean Squared Error (MSE) functions or Multi-scale Structural Similarity (MS-SSIM) functions can be used (1503). When the flag indicates "1," weighted Mean Squared Error (WMSE) function can be used (1505).

As shown in FIG. 15, "D" represents the mean square error (MSE), and "Dw" represents the mean square error based on the weight (WMSE). The terms "width" and "height" are the width and height of the picture/frame, respectively. The terms "$x_t$" and "$x_t^C$" are the current frame and the reconstructed frame, respectively. "$R_{\hat{m}_t}$" and "$R_{\hat{y}_t}$" are the number of bits allocated for the latent representation of motion information and residual information, respectively. "W" is the distortion weight and can be shown as the equation below:

$$W = \frac{w(i, j)}{\sum_{i=0}^{width-1} \sum_{j=0}^{height-1} W(i, j)}$$

The term "w(i, j)" is a weight factor of ERP or CMP.

FIGS. 16A and 16B are charts showing performance comparison of 360-degree videos projected to CMP and ERP formats. Four compression scheme VVC, DOVC (the present disclosure), HEVC, and DVC are analyzed and compared. "WS-PSNR" is a metric to evaluate the difference (quality) between two video clips in spherical domain. The term "Bpp" stands for "bits per pixel" which refers the total number of bits required to code the color information of the pixel. As shown in FIGS. 16A and 16B, the DOVC scheme provides higher quality than the HEVC and DVC schemes. Also, the DOVC scheme can provide quality similar to the VVC scheme FIG. 17 includes images illustrating visual comparison among different methods. In FIG. 17, comparted to RAW image, the image generated based on the DOVC scheme provides higher quality than the images generated based on the HEVC and DVC schemes.

FIGS. 18A-E include images illustrating visual comparison among different methods. FIG. 18A shows a raw frame image. FIG. 18B shows a fused offset prediction map (DOVC) image. FIG. 18C shows an optical flow map image. FIG. 18D shows a bi-directional compensation (DOVC) image. FIG. 18E shows an uni-directional compensation (optical flow) image.

Comparing FIGS. 18B and 18C, the prediction map generated based on the DOVC scheme (FIG. 18B) can better predict the raw picture (FIG. 18A) than the prediction map generated based on the optical flow scheme (FIG. 18C). More particularly, the upper-right corner (indicated by arrow X) of the map of FIG. 18 matches better with the raw picture.

Comparing FIGS. 18D and 18E, the image generated based on the DOVC scheme (FIG. 18D) provides higher quality than the image generated based on the optical flow scheme (FIG. 18E).

FIG. 19 is a chart illustrating analyses on a quality enhance (QE) module in accordance with one or more implementations of the present disclosure. With a QE module, the DOVC scheme can provide better image quality than without the QE module.

Figure 20:
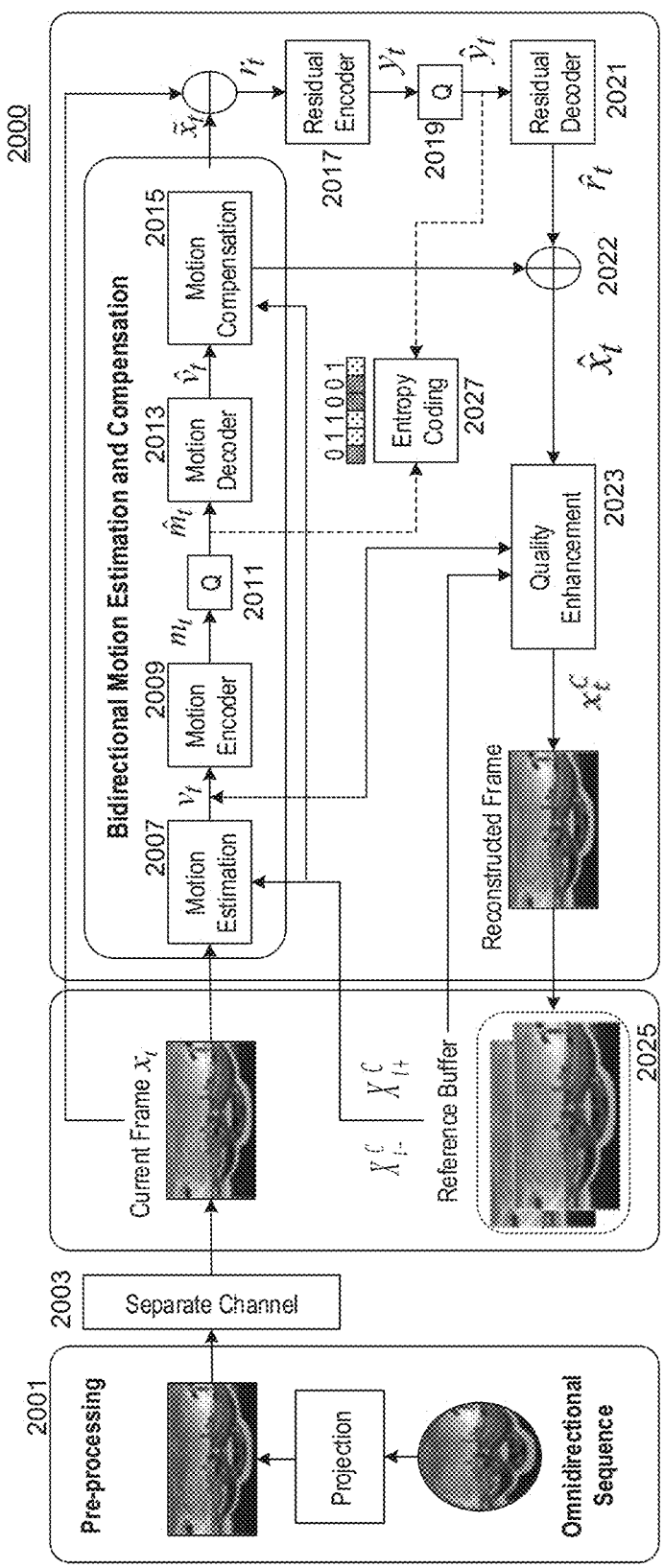
FIG. 20 is a schematic diagram of a DOVC-YUV framework in accordance with one or more implementations of the present disclosure.

FIG. 20 is a schematic diagram of a DOVC-YUV framework 2000 in accordance with one or more implementations of the present disclosure. The system 2000 includes a pre-processing module 2001 configured to process an omnidirectional video sequence to 2D pictures by various projecting schemes (e.g., by the projection module 305 and the video discriminator module 303 discussed above). Once the 2D pictures are formed, they are directed to a channel/component separation module 2003 to divide the 2D pictures into two channels, a luma component Y (which includes luma pictures or frames) and a chroma component UV (which includes chroma pictures such as "Cb" and "Cr").

The pictures in the two channels are separately processed by the system 2000 and then transmitted. The pictures from the two channels can later be merged. More particularly, the luma pictures in the luma component Y and the chroma pictures in the chroma component UV are separately processed (as current frame or current picture $x_t$) by a motion estimation (ME) module 2007, a motion encoder 2009, a quantization module 2011, a motion decoder 2013, and a motion compensation module 2015, so as to complete a bidirectional motion estimation and compensation process and form reconstructed frames or pictures, as discussed in detail below.

The ME module 2007 is configured to generates current motion information $v_t$. The current motion information $v_t$ is then encoded by the motion encoder 2009 to form a latent motion feature $m_t$, and then the latent motion feature $m_t$ is quantized by the quantization module 2011 to obtain a quantized motion feature $\hat{m}_t$. The quantized motion feature $\hat{m}_t$ is then decoded by the motion decoder 2013 to form predicted motion information $\hat{v}_t$.

The predicted motion information $\hat{v}_t$ is then directed to a motion compensation (MC) module 2015 to form a predicted picture $\tilde{x}_t$. The predicted picture $\tilde{x}_t$ is further directed to a substractor 2016, where the difference between the predicted picture $\tilde{x}_t$ and the current picture $x_t$ is calculated. The difference is defined as current residual information $r_t$.

The current residual information $r_t$ is then encoded (by a residual encoder 2017) to generate a latent residual feature $y_t$. Then latent residual feature $y_t$ is quantized (by a quantization module 2019) to obtain a quantized residual feature $\hat{y}_t$. The quantized residual feature $\hat{y}_t$ is then decoded (by a residual decoder 2021) to get predicted residual information $\hat{r}_t$. The prediction picture $\tilde{x}_t$ and the prediction residual information $\hat{r}_t$ are directed to an adder 2022 to obtain a reconstructed picture $\hat{x}_t$.

In some embodiments, the reconstructed picture $\hat{x}_t$ can be used as future reference pictures and stored in a reference buffer 2025. In some embodiments, the reconstructed picture $\hat{x}_t$ can be directed to a quality enhancement (QE) module 2023 for quality enhancement. The QE module 2023 performs a convolutional process so as to enhance the image quality of the reconstructed pictures and obtain quality-enhanced picture $x_t^C$ with higher quality. Embodiments of the QE module 2023 are discussed in detail with reference to FIG. 8. The pictures quality-enhanced picture $x_t^C$ can be used as future reference pictures and stored in a reference buffer 2025.

In some embodiments, an entropy coding module 2027 can be configured to receive the quantized motion feature $\hat{m}_t$ and the quantized residual feature $\hat{y}_t$ to perform an entropy coding (EC) process (e.g., assigning probabilities to symbols and producing a bit sequence or stream from these probabilities) for further processes (e.g., transmission in bit stream).

The DOVC methods that separate luma and chroma components as discussed in FIG. 20 can be named as DOVC-YUV methods, whereas the DOVC methods that do not separate luma and chroma components can be named as DOVC-RGB methods.

Figure 21:
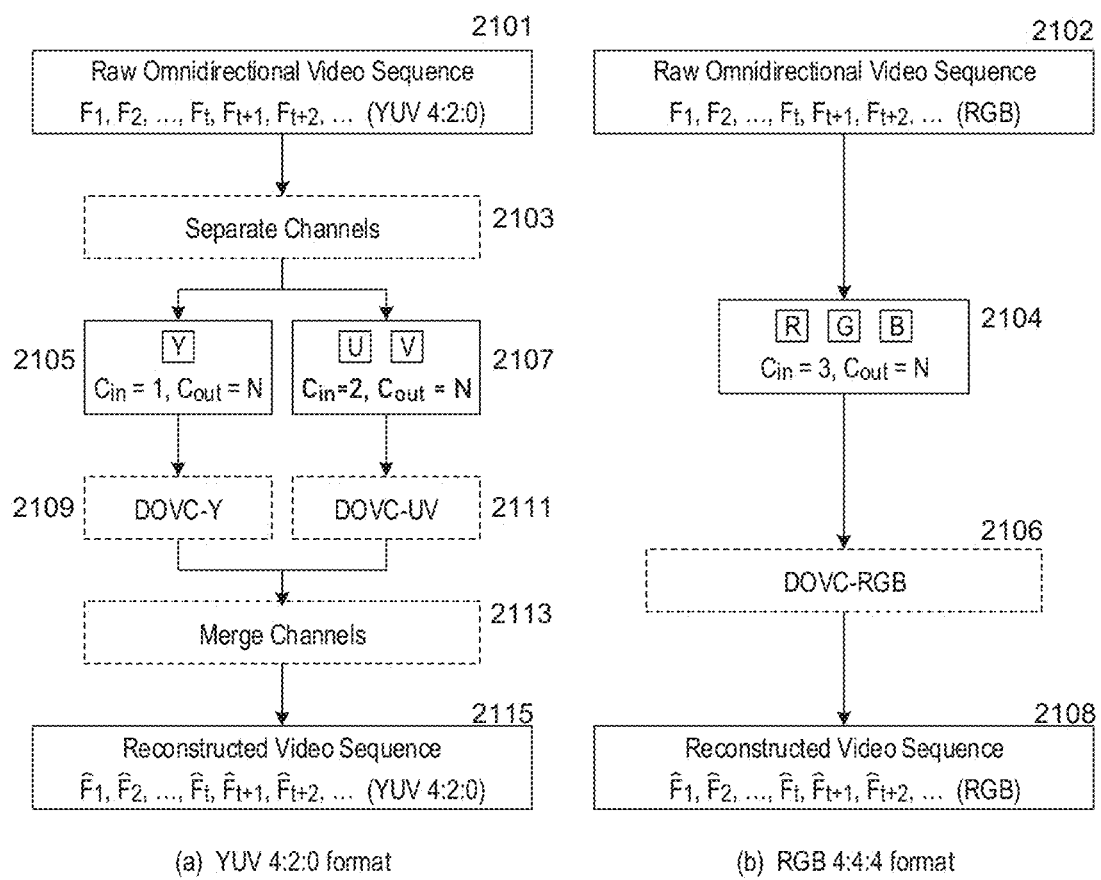
FIG. 21 are schematic diagrams of DOVC-YUV and DOVC-RGB frameworks in accordance with one or more implementations of the present disclosure.

FIG. 21 are schematic diagrams of DOVC-YUV and DOVC-RGB frameworks in accordance with one or more implementations of the present disclosure. The DOVC-YUV framework is noted as "(a) YUV 4:2:0 format" whereas the DOVC-RGB framework is noted as "(b) RGB 4:4:4 format." The "4:2:0" format indicates that luma and chroma components have different resolutions when processed, and the "4:4:4" format indicates that luma and chroma components have the same resolution when processed.

As shown in FIG. 21, the DOVC-YUV framework starts processing raw omnidirectional video at block 2101 to form multiple pictures that include both luma and chroma components (i.e., $F_1, F_2, \ldots, F_t, F_{t+1}, F_{t+2}, \ldots$). At block 2103, the DOVC-YUV framework then moves to separate these pictures into two channels (i.e., luma component 2105 and chroma component 2107).

At the luma component 2105, the luma component of all the pictures are put in the same channel (i.e., DOVC-Y channel 2109). "$C_{in}=1$" presents that there is only one type of input, and "$C_{out}=N$" represents that "N" luma pictures are arranged in series. Similarly, at the chroma channel 2107, the chroma components U, V of all the pictures are put in the same channel (i.e., DOVC-UV channel 2111, "$C_{in}=2$" presents that there are two types of input; and "$C_{out}=N$" represents that "N" chroma pictures are arranged in series).

The DOVC-Y channel 2109 and the DOVC-UV channel 2111 are then merged at block 2113. In some embodiments, the components in the two channels 2109, 2111 can be transmitted in separate bitstreams and then be merged. Once the components in the two channels are merged, reconstructed video sequence ($\hat{F}_t$) can be formed at block 2115.

As also shown in FIG. 21, the DOVC-RGB framework starts processing raw omnidirectional video at block 2102 to form multiple pictures that include RGB components (i.e., $F_1, F_2, \ldots, F_t, F_{t+1}, F_{t+2}, \ldots$). At block 2104, the DOVC-RGB framework combines these pictures in the same channel (i.e., RGB channel 2106). "$C_{in}=3$" presents that there are three type of input, and "$C_{out}=N$" represents that "N" pictures are arranged in series. At block 2108, reconstructed video sequence ($\hat{F}_t$) can be formed.

Figure 22:
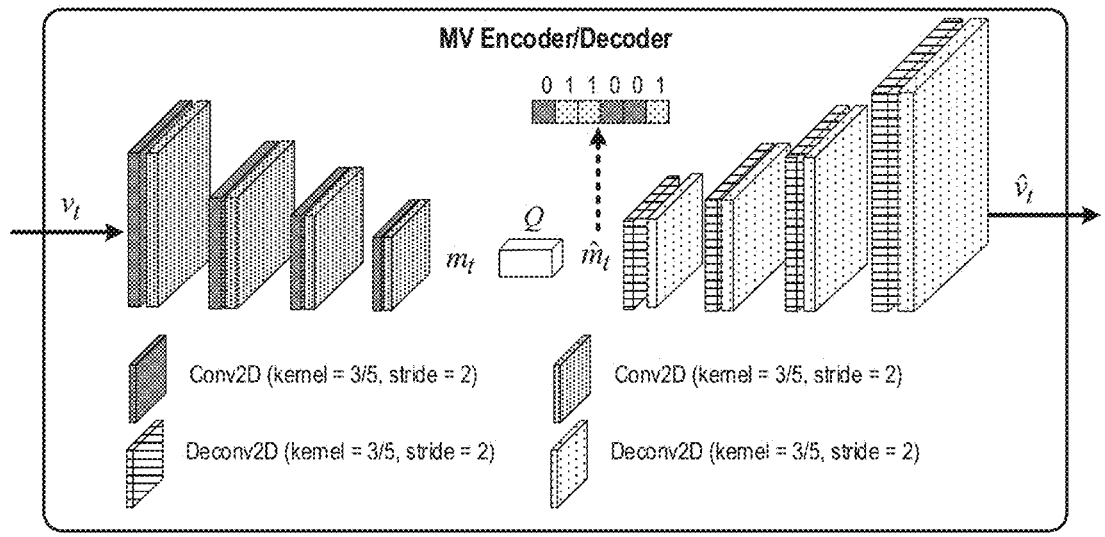
FIG. 22 is a schematic diagram of a network structure of a motion vector (MV) encoder/decoder in a DOVC-YUV framework in accordance with one or more implementations of the present disclosure.

FIG. 22 is a schematic diagram of a network structure of a motion vector (MV) encoder/decoder 2200 in a DOVC-YUV framework in accordance with one or more implementations of the present disclosure. The MV encoder/decoder 2200 has generally the same functions as the MV encoder/decoder 203 discussed herein. When the MV encoder/decoder 2200 is used to process video sequences under the DOVC-YUV framework, parameters for the chroma components (UV) and the luma component (Y) can be set differently.

Generally speaking, coding the chroma component is easier (i.e., requires much less bitrate) than the luma component. For example, as shown in FIG. 22, compression parameter "kernel" for the chroma component (UV) can be set as "3," whereas compression parameter "kernel" for the luma component (Y) can be set as "5." More particularly, a "3×3" convolution kernel with little or no loss in chroma coding can be used, and a "5×5" convolution kernel can be used in luma coding. By this arrangement, the chroma and luma components can have different resolutions.

Figure 23:
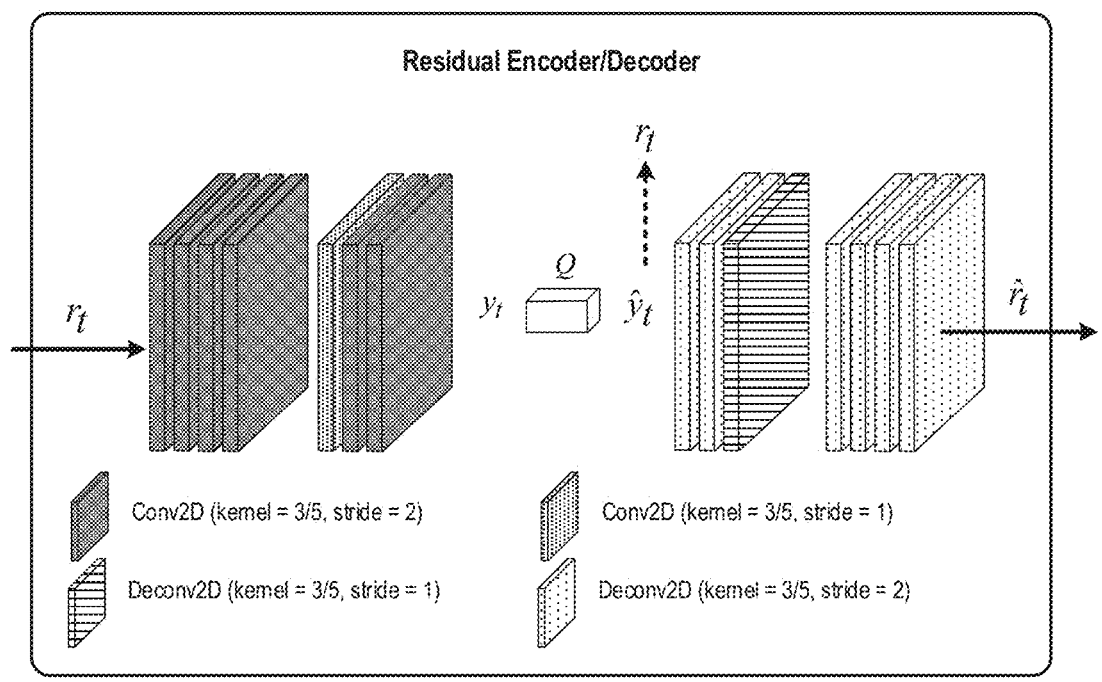
FIG. 23 is a schematic diagram of a network structure of a residual encoder/decoder in a DOVC-YUV framework in accordance with one or more implementations of the present disclosure.

FIG. 23 is a schematic diagram of a network structure of a residual encoder/decoder 2300 in a DOVC-YUV framework in accordance with one or more implementations of the present disclosure. The residual encoder/decoder 2300 has generally the same functions as the residual encoder/decoder 211 discussed herein. When the residual encoder/decoder 2300 is used to process video sequences under the DOVC-YUV framework, parameters for the chroma components (UV) and the luma component (Y) can be set differently. Similar to the configuration of the MV encoder/decoder 2200, to better compress the residual information, the residual encoder/decoder 2300 can use a "3×3" convolution kernel with little or no loss in chroma coding rather than a "5×5" convolution kernel as shown in FIG. 23.

Figure 24:
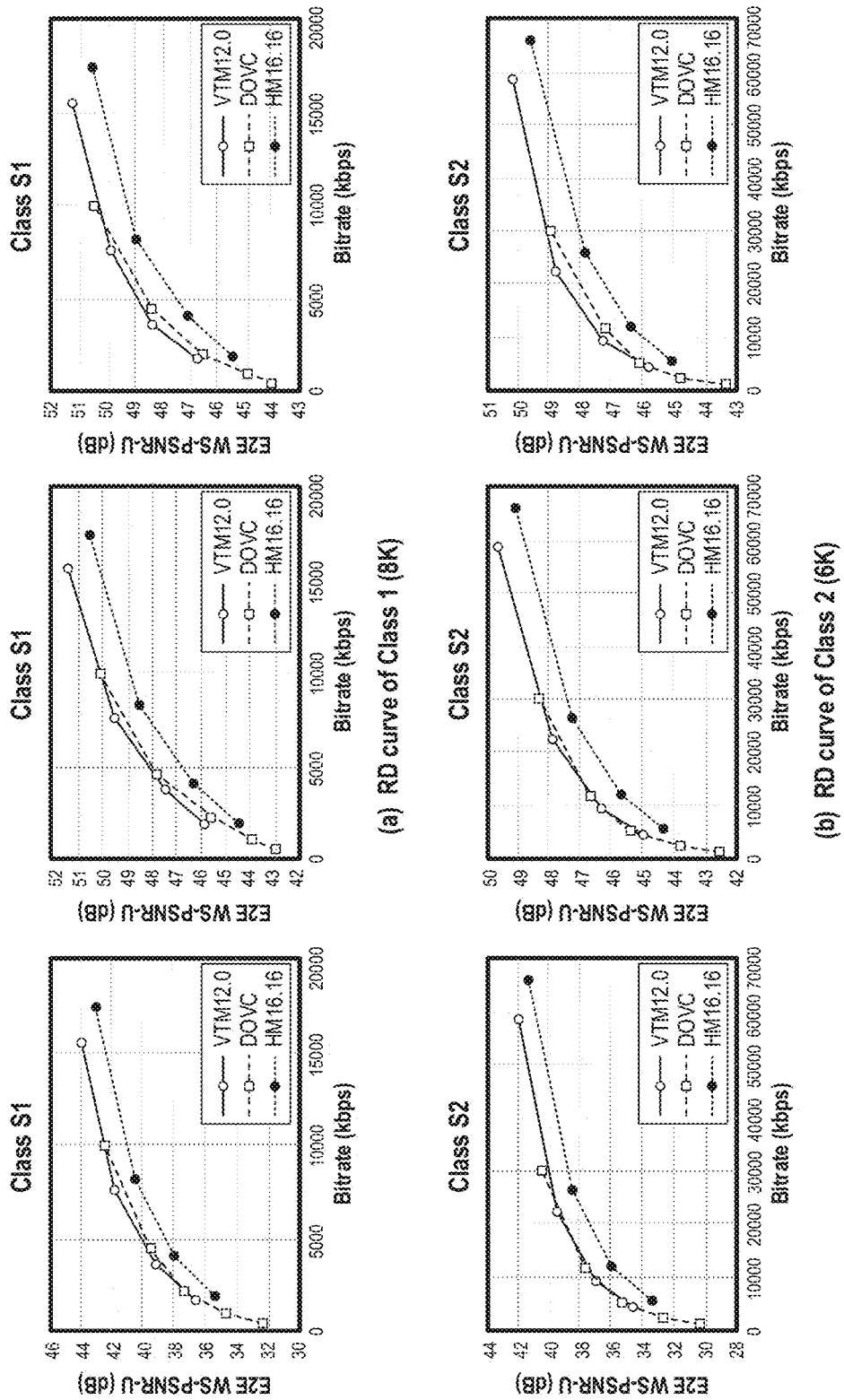
FIG. 24 include charts showing experimental results (rate-distortion, RD, curves) of the DOVC-YUV framework in accordance with one or more implementations of the present disclosure.

FIG. 24 include charts showing experimental results (rate-distortion, RD, curves) of the DOVC-YUV framework in accordance with one or more implementations of the present disclosure. The present DOVC-YUV frameworks are tested and compared with a VTM12.0 framework (which corresponds to VVC/H.266 standard) with random access (RA) mode and an HM16.16 framework (which corresponds to HEVC/H.265 standard). FIG. 24 shows experimental results on 360-degree test sequences provided by JVET, including two testing cases, (a) class 1 (8K) and (b) class 2 (6K).

Using an average end-to-end WS-PSNR (peak signal-to-noise ratio) of Y, U, and V components as metrices, the testing results in FIG. 24 shows that the DOVC-YUV framework outperforms the HM16.16 framework (HEVC/H.265) on video compression by a large margin and even achieves objective performance comparable to the latest VTM12.0 framework (VVC/H.266). Advantages of the present DOVC-YUV method include that it uses significantly fewer computing resources (at least due to its flexible resolution configurations for chroma and luma components).

Figures 25, 26, 27:
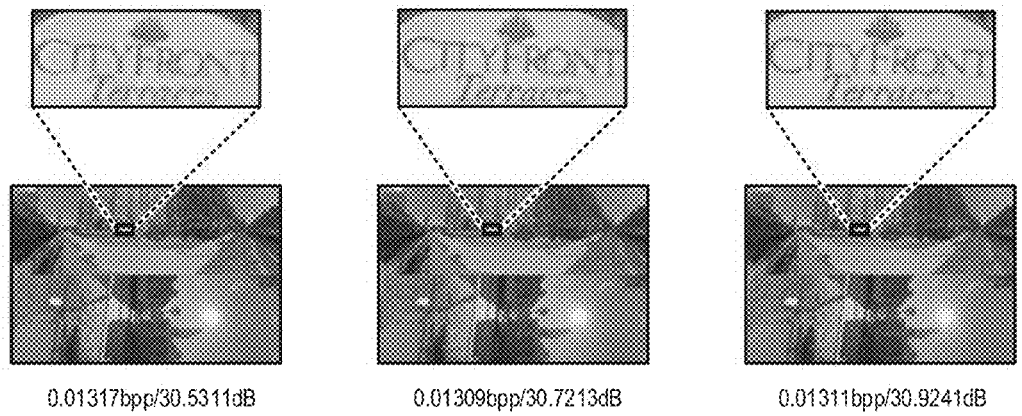
FIGS. 25 and 26 are tables showing experimental results of the DOVC-YUV framework in accordance with one or more implementations of the present disclosure.
FIG. 27 includes images showing a visual comparison among different video compression methods, including the DOVC-YUV framework in accordance with one or more implementations of the present disclosure.

FIGS. 25 and 26 are tables showing experimental results of the DOVC-YUV framework in accordance with one or more implementations of the present disclosure. In FIGS. 25 and 16, BDBR (%)(i.e., average percentage of bit rate savings) and BD-WSPSNR(dB) (i.e., gains (dB) when compared with a baseline algorithm at the same bit rate) are the metrices.

In FIG. 25, the present DOVC-YUV frameworks are compared with the HM16.16 framework (HEVC/H.265 standard). In other words, the present DOVC-YUV method significantly outperforms the HM16.16 framework.

In FIG. 26, the present DOVC-YUV frameworks are compared with the VTM12.0 framework (VVC/H.266). As shown in FIG. 26, the present DOVC-YUV method achieves comparable performance in BDBR and BD-WSPSNR compared to the VTM12.0 framework. However, as noted above, the present DOVC-YUV method can achieve generally the same result as the VTM12.0 framework by using significantly fewer computing resources.

FIG. 27 includes images showing a visual comparison (360-degree test sequences) among different video compression methods, including the DOVC-YUV framework in accordance with one or more implementations of the present disclosure. As shown in FIG. 27, the visual quality of the DOVC-YUV framework 2703 is significantly better than the visual quality of the HM16.16 framework 2701. As also shown in FIG. 27, the visual quality of the DOVC-YUV framework 2703 is comparable to the visual quality of the VTM12.0 framework.

Figure 28:
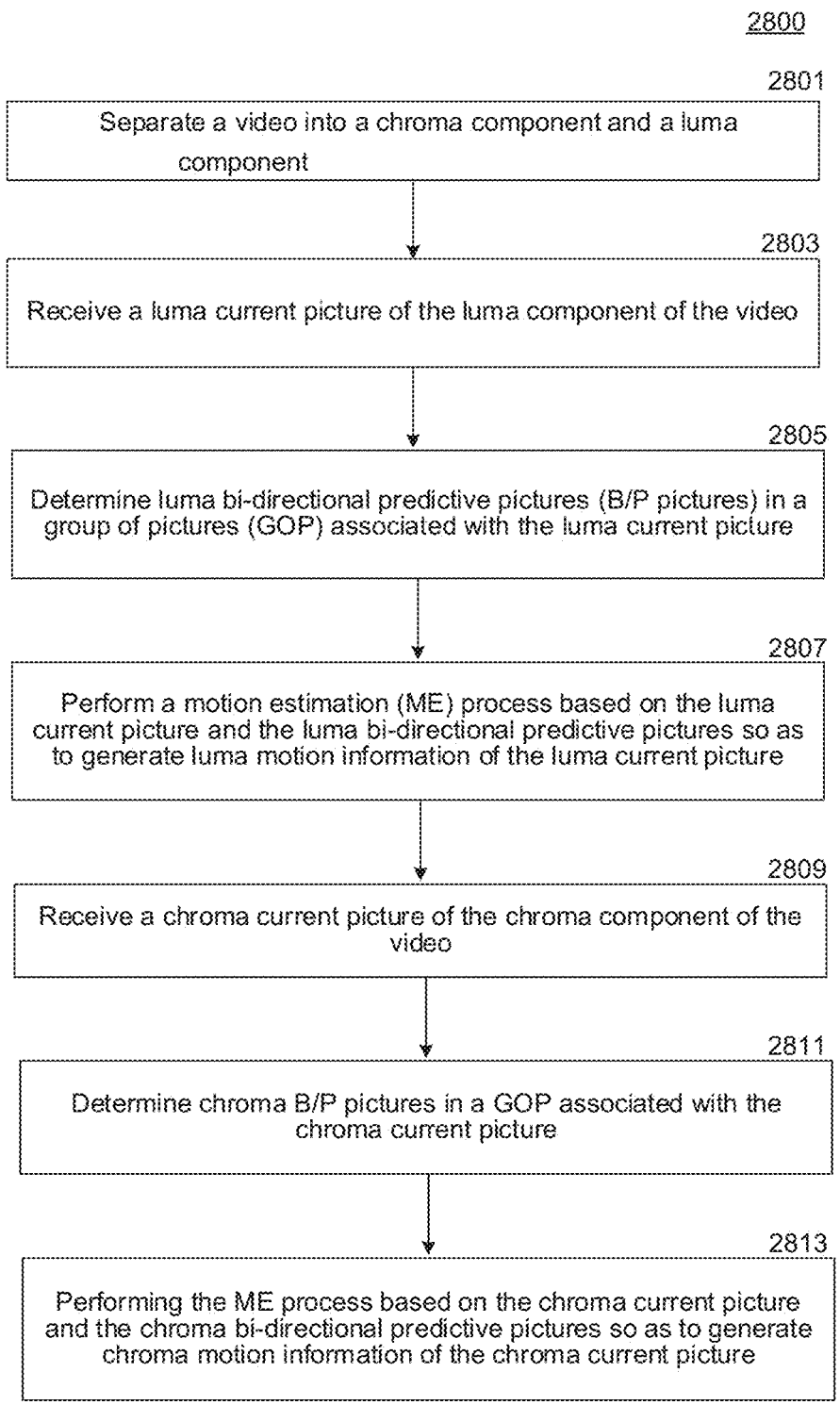
FIG. 28 is a flowchart of a method in accordance with one or more implementations of the present disclosure.

FIG. 28 is a flowchart of a method 2800 in accordance with one or more implementations of the present disclosure. The method 2800 can be implemented by a system (such as a system with the DOVC-YUV framework 2000). The method 2800 is for bi-directional image processing with separate chroma and luma components. The method 2800 includes, at block 2801, separating a video into a chroma component and a luma component.

At block 2803, the method 2800 continues by receiving a luma current picture of the luma component of the video. Specifically, the luma current picture refers to luma components of all blocks in the current picture. At block 2805, the method 2800 continues by determining luma bi-directional predictive pictures (B/P pictures) in a group of pictures (GOP) associated with the luma current picture. At block 2807, the method 2800 continues by performing a motion estimation (ME) process based on the luma current picture and the luma bi-directional predictive pictures so as to generate luma motion information of the luma current picture. The processes discussed in blocks 2803, 2805 and 2807 are for the luma components of the video.

Blocks 2809, 2811, and 2813 are for the chroma components of the video. At block 2809, the method 2800 includes receiving a chroma current picture of the chroma component of the video. Specifically, the chroma current picture refers to chroma components of all blocks in the current picture. At block 2811, the method 2800 continues by determining chroma B/P pictures in a GOP associated with the chroma current picture. At block 2813, the ME process is performed based on the chroma current picture and the chroma bi-directional predictive pictures so as to generate chroma motion information of the chroma current picture.

In some embodiments, the processes for the luma components (blocks 2803, 2805 and 2807) and the processes for the chroma components (blocks 2809, 2811, and 2813) can be implemented in parallel. In some embodiments, the processes for the chroma components can be implemented prior to the processes for the luma components, or vice versa.

In some embodiments, the method 2800 can include merging the chroma component and the luma component to form a reconstructed video. In some embodiments, the GOP includes a first key picture and a second key picture. The first key picture is at a first time prior to the chroma or luma current picture, and the second key picture is at a second time later than the chroma or luma current picture.

In some embodiments, the method 2800 can include transmitting information of the first key picture and the second key picture in a bitstream. In some embodiments, method 2800 can further include (1) generating a first reference picture based on the first key picture ($x_s^I$); and (2) generating a second reference picture based on the second key picture ($x_e^I$). The first reference picture can be a first reconstructed picture ($x_s^C$) based on the first key picture ($x_s^I$) processed by a better portable graphics (BPG) image compression tool. The second reference picture can be a second reconstructed picture ($x_e^C$) based on the second key picture ($x_e^I$) processed by the BPG image compression tool.

In some embodiments, the method 2800 can include encoding the chroma and luma motion information by a motion vector (MV) encoder so as to form a latent motion feature of the current luma picture and the current chroma picture, respectively. A first compression parameter used by the MV encoder for the current luma picture can be different from a second compression parameter used by the MV encoder for the current chroma picture (see, e.g., FIG. 22).

In some embodiments, the method 2800 can include encoding residual information of the chroma and luma current pictures by a residual encoder so as to form a latent residual feature of the current luma picture and the current chroma picture, respectively. A first compression parameter used by the residual encoder for the current luma picture can be different from a second compression parameter used by the residual encoder for the current chroma picture (see, e.g., FIG. 23).

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for video processing, comprising:
    parsing a first bitstream to determine a first quantized motion feature, wherein the first quantized motion feature is formed from first motion information of a luma current picture, wherein the first motion information is determined based on the luma current picture and first bi-directional predictive (B/P) pictures in a first group of pictures (GOP) based on first sets of reference pictures of the luma current picture; and
    decoding the first quantized motion feature to form a luma motion information by an MV decoder.

2. The method of claim 1, further comprising:
    parsing a second bitstream to determine a second quantized motion feature, wherein the second quantized motion feature is formed from second motion information of a chroma current picture, wherein the second motion information is determined based on the chroma current picture and second B/P pictures in a second GOP based on second sets of reference pictures of the chroma current picture; and
    decoding the second quantized motion feature to form a chroma motion information by the MV decoder.

3. The method of claim 2, further comprising:
    decoding the chroma and luma motion information by the MV decoder so as to form a latent motion feature of the luma current picture and the chroma current picture, respectively,
    wherein a first compression parameter used by the MV decoder for the luma current picture is different from a second compression parameter used by the MV decoder for the chroma current picture.

4. The method of claim 2, further comprising:
decoding residual information of the chroma and luma current pictures by a residual decoder so as to form a latent residual feature of the luma current picture and the chroma current picture, respectively,
wherein a first compression parameter used by the residual decoder for the luma current picture is different from a second compression parameter used by the residual decoder for the chroma current picture.

5. The method of claim 1, wherein the GOP includes a first key picture ($x_s^I$) and a second key picture ($x_e^I$), wherein the first key picture is at a first time prior to the chroma or luma current picture, and wherein the second key picture is at a second time later than the chroma or luma current picture.

6. The method of claim 5, further comprising:
generating a first reference picture based on the first key picture ($x_s^I$); and
generating a second reference picture based on the second key picture ($x_e^I$).

7. The method of claim 6, wherein:
the first reference picture is a first reconstructed picture ($x_s^C$) based on the first key picture ($x_s^I$) processed by a better portable graphics (BPG) image compression tool; and
the second reference picture is a second reconstructed picture ($x_e^C$) based on the second key picture ($x_e^I$) processed by the BPG image compression tool.

8. An encoder for video processing, comprising:
a processor;
a memory configured to store instructions, which when executed by the processor, cause the processor to:
separate a video into a chroma component and a luma component;
receive a luma current picture of the luma component of the video;
determine luma bi-directional predictive (B/P) pictures in a group of pictures (GOP) associated with the luma current picture; and
perform a motion estimation (ME) process based on the luma current picture and the luma bi-directional predictive pictures so as to generate luma motion information of the luma current picture.

9. The encoder of claim 8, wherein the instructions, when executed by the processor, further cause the processor to:
receive a chroma current picture of the chroma component of the video;
determine chroma B/P pictures in a GOP associated with the chroma current picture; and
perform the ME process based on the chroma current picture and the chroma bi-directional predictive pictures so as to generate chroma motion information of the chroma current picture.

10. The encoder of claim 9, wherein the instructions, when executed by the processor, further cause the processor to:
encode the chroma and luma motion information by a motion vector (MV) encoder so as to form a latent motion feature of the luma current picture and the chroma current picture, respectively,
wherein a first compression parameter used by the MV encoder for the luma current picture is different from a second compression parameter used by the MV encoder for the chroma current picture.

11. The encoder of claim 8, wherein the GOP includes a first key picture ($x_s^I$) and a second key picture ($x_e^I$), wherein the first key picture is at a first time prior to the chroma or luma current picture, and wherein the second key picture is at a second time later than the chroma or luma current picture.

12. The encoder of claim 11, wherein the instructions, when executed by the processor, further cause the processor to:
generate a first reference picture based on the first key picture ($x_s^I$); and
generate a second reference picture based on the second key picture ($x_e^I$).

13. The encoder of claim 12, wherein:
the first reference picture is a first reconstructed picture ($x_s^C$) based on the first key picture ($x_s^I$) processed by a better portable graphics (BPG) image compression tool; and
the second reference picture is a second reconstructed picture ($x_e^C$) based on the second key picture ($x_e^I$) processed by the BPG image compression tool.

14. A decoder for video processing, comprising:
a processor;
a memory configured to store instructions, which when executed by the processor, cause the processor to:
parse a first bitstream to obtain a first quantized motion feature, wherein the first quantized motion feature is formed from first motion information of a luma current picture, wherein the first motion information is determined based on first bi-directional predictive (B/P) pictures in a first group of pictures (GOP) based on first sets of reference pictures of the luma current picture, and wherein the luma current picture is from a luma component separated from a video;
decode the first quantized motion feature to form a luma motion information by an MV decoder.

15. The decoder of claim 14, wherein the instructions, when executed by the processor, further cause the processor to:
parse a second bitstream to obtain a second quantized motion feature, wherein the second quantized motion feature is formed from second motion information of a chroma current picture, wherein the second motion information is determined based on second B/P pictures in a second GOP based on a second set of reference pictures of the chroma current picture, and wherein the chroma current picture is from a chroma component; and
decode the second quantized motion feature to form a chroma motion information by the MV decoder.

16. The decoder of claim 15, wherein the instructions, when executed by the processor, further cause the processor to:
decode the chroma and luma motion information by the MV decoder so as to form a latent motion feature of the luma current picture and the chroma current picture, respectively,
wherein a first compression parameter used by the MV decoder for the luma current picture is different from a second compression parameter used by the MV decoder for the chroma current picture.

17. The decoder of claim 15, wherein the instructions, when executed by the processor, further cause the processor to:
decode residual information of the chroma and luma current pictures by a residual decoder so as to form a latent residual feature of the luma current picture and the chroma current picture, respectively, wherein a first compression parameter used by the residual decoder for the luma current picture is different from a second compression parameter used by the residual decoder for the chroma current picture.

18. The decoder of claim 14, wherein the GOP includes a first key picture ($x_s^I$) and a second key picture ($x_e^I$), wherein the first key picture is at a first time prior to the chroma or luma current picture, and wherein the second key picture is at a second time later than the chroma or luma current picture.

19. The decoder of claim 18, wherein the instructions, when executed by the processor, further cause the processor to:

generate a first reference picture based on the first key picture ($x_s^I$); and generate a second reference picture based on the second key picture ($x_e^I$).

20. The decoder of claim 19, wherein:

the first reference picture is a first reconstructed picture ($x_s^C$) based on the first key picture ($x_s^I$) processed by a better portable graphics (BPG) image compression tool; and the second reference picture is a second reconstructed picture ($x_e^C$) based on the second key picture ($x_e^I$) processed by the BPG image compression tool.

* * * * *